(12) United States Patent
Wang et al.

(10) Patent No.: US 12,307,699 B2
(45) Date of Patent: May 20, 2025

(54) THREE-DIMENSIONAL RECONSTRUCTION METHOD AND THREE-DIMENSIONAL RECONSTRUCTION APPARATUS

(71) Applicant: Huawei Technologies Co., Ltd., Guangdong (CN)

(72) Inventors: Hao Wang, Wuhan (CN); Linlin Zhang, Voorburg (NL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/902,624

(22) Filed: Sep. 2, 2022

(65) Prior Publication Data
US 2022/0414911 A1 Dec. 29, 2022

Related U.S. Application Data

(63) Continuation of application No. PCT/CN2021/074094, filed on Jan. 28, 2021.

(51) Int. Cl.
*G06T 7/50* (2017.01)
*G06T 7/55* (2017.01)
(Continued)

(52) U.S. Cl.
CPC ............ *G06T 7/55* (2017.01); *G06T 7/75* (2017.01); *G06T 19/00* (2013.01);
(Continued)

(58) Field of Classification Search
CPC .......... G06T 19/00; G06T 2207/20081; G06T 2207/20084; G06T 2207/30244; G06T 2210/56; G06T 7/55; G06T 7/75
See application file for complete search history.

(56) References Cited

U.S. PATENT DOCUMENTS

2015/0015582 A1 1/2015 Kaiser et al.
2019/0138786 A1* 5/2019 Trenholm ............. G06F 18/241
(Continued)

FOREIGN PATENT DOCUMENTS

| CN | 101350016 B | 11/2010 |
| CN | 102129708 A | 7/2011 |

(Continued)

OTHER PUBLICATIONS

Alexander Grabner et al, Location Field Descriptors: Single Image 3D Model Retrieval in the Wild, 2019 International Conference on 3D Vision (3DV), 11 pages.

*Primary Examiner* — Sing-Wai Wu
(74) *Attorney, Agent, or Firm* — WOMBLE BOND DICKINSON (US) LLP

(57) ABSTRACT

An embodiment of this application discloses a three-dimensional reconstruction method. The method in this embodiment of this application includes: obtaining an image of a first object and a camera pose of the image; determining a first normalized object location field NOLF image of the first object in the image by using a first deep learning network, where the first NOLF image indicates a normalized three-dimensional point cloud of the first object at a photographing angle of view of the image; determining, from a plurality of three-dimensional models in a model database based on the first NOLF image, a first model corresponding to the first object; determining a pose of the first object based on the first model and the camera pose of the image; and performing three-dimensional reconstruction on the first object in the image based on the first model and the pose of the first object.

17 Claims, 11 Drawing Sheets

(51) Int. Cl.
*G06T 7/73* (2017.01)
*G06T 17/00* (2006.01)
*G06T 19/00* (2011.01)
*G06T 19/20* (2011.01)

(52) U.S. Cl.
CPC ........... *G06T 2207/20081* (2013.01); *G06T 2207/20084* (2013.01); *G06T 2207/30244* (2013.01); *G06T 2210/56* (2013.01)

(56) References Cited

U.S. PATENT DOCUMENTS

2020/0057778 A1\* 2/2020 Sun .................... G06N 3/04
2020/0388071 A1\* 12/2020 Grabner ................ G06T 17/20

FOREIGN PATENT DOCUMENTS

| CN | 103116904 A | 5/2013 |
| CN | 104637090 B | 7/2017 |
| CN | 107833270 A | 3/2018 |
| WO | 2018050516 A1 | 3/2018 |

\* cited by examiner

RBG   NOLF (XYZ)

THREE-DIMENSIONAL RECONSTRUCTION METHOD AND THREE-DIMENSIONAL RECONSTRUCTION APPARATUS

CROSS-REFERENCE TO RELATED APPLICATIONS

This application is a continuation of International Application No. PCT/CN2021/074094, filed on Jan. 28, 2021, which claims priority to Chinese Patent Application No. 202010143002.1, filed on Mar. 4, 2020. The disclosures of the aforementioned applications are hereby incorporated by reference in their entireties.

TECHNICAL FIELD

This application relates to three-dimensional modeling technologies, and in particular, to a three-dimensional reconstruction method and a three-dimensional reconstruction apparatus.

BACKGROUND

Three-dimensional digital data can improve human cognitive levels of real space, and bring rich information far beyond two-dimensional image data. It is a common solution to use a high-precision laser scanner to obtain point cloud information of a three-dimensional environment for modeling. However, the laser scanner is expensive. How to efficiently and accurately obtain real and available three-dimensional digital data with low costs is one of key bottlenecks that restrict further development of three-dimensional application.

In the conventional image technology, image analysis is performed, based on a pre-constructed model database, on a single scene image input by a user, to obtain a partial image of a target model. Model retrieval is performed in the pre-constructed model database, to determine a matched model, and implement three-dimensional reconstruction. The pre-constructed model database projects a three-dimensional model based on different locations and angles in virtual three-dimensional space, and replaces the three-dimensional model with a group of projection images at a plurality of angles. In this way, a two-dimensional-three-dimensional retrieval issue in model retrieval is converted into a two-dimensional-two-dimensional similarity measurement issue. When a projection image of a three-dimensional model at an angle of view is similar to a to-be-retrieved partial image, it is considered that the three-dimensional model corresponding to the projection image is a retrieval result.

In the conventional technology, a preset three-dimensional model is projected at a preset location and angle, and a group of projection images at a plurality of angles in the model database indicate one three-dimensional model. However, during actual photographing, an angle of view of a scene image is usually random, and rarely matches a location and an angle of a projection image in the model database. Therefore, accuracy of model retrieval is low.

SUMMARY

An embodiment of this application provides a three-dimensional reconstruction method, to implement three-dimensional reconstruction of an object by using a two-dimensional image. This can improve accuracy of three-dimensional model matching.

According to a first aspect, an embodiment of this application provides a three-dimensional reconstruction method, including: obtaining an image of a first object and a camera pose of the image; determining a first normalized object location field NOLF image of the first object in the image by using a first deep learning network, where the first NOLF image indicates a normalized three-dimensional point cloud of the first object at a photographing angle of view of the image; determining, from a plurality of three-dimensional models in a model database based on the first NOLF image, a first model corresponding to the first object; determining a pose of the first object based on the first model and the camera pose of the image; and performing three-dimensional reconstruction on the first object in the image based on the first model and the pose of the first object.

In the three-dimensional reconstruction method provided in this embodiment of this application, the two-dimensional image obtained through photographing a scenario including the first object is obtained and input to the deep learning network, to obtain the NOLF image of the first object. The first NOLF image indicates the normalized three-dimensional point cloud of the first object at the photographing angle of view of the image. The first model corresponding to the first object is determined from the model database based on the first NOLF image. The pose of the first object is determined based on the first model and the camera pose of the image, to implement three-dimensional reconstruction of the first object in the image. Because the NOLF image of the first object indicates the normalized three-dimensional point cloud of the first object at the photographing angle of view of the image, that is, a portion of three-dimensional information of the first object at the photographing angle of view of the image is restored by using the deep learning network, three-dimensional retrieval is performed by using the NOLF image, this solution, compared with the conventional technology, can improve accuracy of model matching, and further improve a success rate of three-dimensional reconstruction.

In one embodiment, the method further includes: determining a first relative pose of the first object based on the first NOLF image, where the first relative pose is a relative pose between the pose of the first object and the camera pose of the image; and determining NOLF images of the plurality of three-dimensional models at an angle of view corresponding to the first relative pose; and the determining, from a plurality of three-dimensional models in a model database based on the first NOLF image, a first model corresponding to the first object includes: determining, from the NOLF images respectively corresponding to the plurality of three-dimensional models, the first model corresponding to an NOLF image with a highest similarity to the first NOLF image.

In the three-dimensional reconstruction method provided in this embodiment of this application, the first relative pose between the first object and a camera during photographing may be determined based on the first NOLF image, and a candidate NOLF image of each three-dimensional model in the model database may be obtained based on the first relative pose. A location and a direction of an observation point may be determined based on the first relative pose and a posture of the three-dimensional model. The NOLF image of the three-dimensional model indicates a normalized three-dimensional point cloud of a visible part of the three-dimension model when the three-dimensional model is observed from the location and the direction of the observation point. That the three-dimensional model is observed from the location and the direction of the observation point may be understood as simulating the photographing the first object by the camera. Therefore, the candidate NOLF image of the three-dimensional model used for comparison may be obtained. A three-dimensional model corresponding to the NOLF image with the highest similarity to the first NOLF image is determined as the first model based on similarities between a plurality of candidate NOLF images and the first NOLF image. In the method in this embodiment of this application, the candidate NOLF image is obtained based on a calculated initial pose. This can reduce retrieval difficulty. In addition, a two-dimensional modeling object and an object in a preset three-dimensional model database are represented in a same data form: an NOLF image, and the data form is irrelevant to a light condition of a modeling target in a real image and a texture detail of a three-dimensional model. A three-dimensional point cloud indicated by the NOLF image implies a three-dimensional shape and geometric information of the first object. This facilitates similarity comparison between objects in feature space.

In one embodiment, the determining a first relative pose of the first object based on the first NOLF image includes: determining pixel coordinates of at least four feature points of the first object in the image by using a second deep learning network, where four object points indicated by the four feature points are not coplanar in three-dimensional space; determining three-dimensional coordinates of the at least four feature points in the first NOLF image; and determining the first relative pose based on the pixel coordinates and the three-dimensional coordinates of the at least four feature points.

In the three-dimensional reconstruction method provided in this embodiment of this application, the at least four feature points may be determined based on the first NOLF image. Because the first NOLF image is a two-dimensional image, the pixel coordinates of the feature points in the first NOLF image may be determined. In addition, the NOLF image indicates the three-dimensional point cloud, and each pixel point corresponds to one three-dimensional coordinate. Therefore, a correspondence between the pixel coordinates and the three-dimensional coordinates of the feature points may be obtained, and a relative pose of the camera relative to the first object when the image is photographed may be obtained through calculation by using the correspondence between the pixel coordinates and the three-dimensional coordinates of the at least four feature points.

In one embodiment, the determining the first relative pose based on the pixel coordinates and the three-dimensional coordinates of the at least four feature points includes: determining the first relative pose based on the pixel coordinates and the three-dimensional coordinates of the at least four feature points and by using a Perspective-n-Point PnP estimation algorithm.

In the three-dimensional reconstruction method provided in this embodiment of this application, a specific implementation of calculating the relative pose is provided, that is, calculation is performed by using the PnP algorithm.

In one embodiment, the feature points of the first object include eight corner points of a bounding box of the first object.

In the three-dimensional reconstruction method provided in this embodiment of this application, the feature points may specifically be the corner points of the bounding box of the first object. Because corner points of bounding boxes of all objects can be determined, the method is universal and easy to implement. Alternatively, a deep learning network may be trained, and the corner points of the bounding box of the object is predicted by using the deep learning network, to determine the feature points of the first object. An accurate three-dimensional model spatial pose is calculated based on the retrieved three-dimensional model, a correspondence between the corner points of the bounding box of the three-dimensional model and predicted corner points of a bounding box of the modeling target in the two-dimensional image, and intrinsic and extrinsic parameters of the camera corresponding to the image, to place the model in a real three-dimensional space location.

In one embodiment, the method further includes: inputting the image to the first deep learning network, and determining a first original NOLF image; and determining the first NOLF image based on the first original NOLF image and an image mask of the first object. In one embodiment, the method further includes: determining the image mask of the first object in the image by using a third deep learning network. In one embodiment, the third deep learning network may be the same as or different from the first deep learning network. This is not specifically limited herein.

In the three-dimensional reconstruction method provided in this embodiment of this application, the image mask of the first object may further be determined by using the third deep learning network, and the first NOLF image is determined based on the mask.

In one embodiment of the first aspect, the model database includes types of the plurality of three-dimensional models, the first object belongs to a first type, and the method further includes: determining, based on the first NOLF image, the first model from three-dimension models belonging to the first type. In one embodiment, the method further includes: inputting the image to a fourth deep learning network, and determining that the first object belongs to the first type. In one embodiment, the fourth deep learning network may be the same as or different from the first deep learning network. This is not specifically limited herein.

In the three-dimensional reconstruction method provided in this embodiment of this application, a type of the first object may alternatively be predicted by using the fourth deep learning network, and a three-dimensional model belonging to the type is determined from the model database based on the type and is used for subsequent model matching. This can reduce a calculation amount.

According to a second aspect, an embodiment of this application provides a three-dimensional reconstruction apparatus, including: an obtaining unit, configured to obtain an image of a first object and a camera pose of the image; a determining unit, configured to determine a first normalized object location field NOLF image of the first object in the image by using a first deep learning network, where the first NOLF image indicates a normalized three-dimensional point cloud of the first object at a photographing angle of view of the image, the determining unit is configured to determine, from a plurality of three-dimensional models in a model database based on the first NOLF image, a first model corresponding to the first object, and the determining unit is further configured to determine a pose of the first object based on the first model and the camera pose of the image; and a reconstruction unit, configured to perform three-dimensional reconstruction on the first object in the image based on the first model and the pose of the first object.

The determining unit is further configured to: determine a first relative pose of the first object based on the first NOLF image, where the first relative pose is a relative pose between the pose of the first object and the camera pose of the image; and determine NOLF images of the plurality of three-dimensional models at an angle of view corresponding to the first relative pose. The determining unit is specifically configured to determine, from the NOLF images respectively corresponding to the plurality of three-dimensional models, the first model corresponding to an NOLF image with a highest similarity to the first NOLF image.

The determining unit is specifically configured to: determine pixel coordinates of at least four feature points of the first object in the image by using a second deep learning network, where four object points indicated by the four feature points are not coplanar in three-dimensional space; determine three-dimensional coordinates of the at least four feature points in the first NOLF image; and determine the first relative pose based on the pixel coordinates and the three-dimensional coordinates of the at least four feature points.

The determining unit is specifically configured to determine the first relative pose based on the pixel coordinates and the three-dimensional coordinates of the at least four feature points and by using a Perspective-n-Point PnP estimation algorithm.

The feature points of the first object include eight corner points of a bounding box of the first object.

The determining unit is specifically configured to: input the image to the first deep learning network, and determine a first original NOLF image; and determine the first NOLF image based on the first original NOLF image and an image mask of the first object.

The model database includes types of the plurality of three-dimensional models, the first object belongs to a first type, and the determining unit is specifically configured to determine, based on the first NOLF image, the first model from three-dimension models belonging to the first type.

According to a third aspect, an embodiment of this application provides a three-dimensional reconstruction apparatus, including a processor and a memory. The processor and the memory are interconnected, the memory is configured to store a computer program, the computer program includes program instructions, and the processor is configured to invoke the program instructions, to perform the method in any one of the first aspect or the possible implementations of the first aspect.

According to a fourth aspect, an embodiment of this application provides a computer program product including instructions. When the computer program product is run on a computer, the computer is enabled to perform the method in any one of the first aspect or the possible implementations of the first aspect.

According to a fifth aspect, an embodiment of this application provides a computer-readable storage medium including instructions. When the instructions are run on a computer, the computer is enabled to perform the method in any one of the first aspect or the possible implementations of the first aspect.

According to a sixth aspect, an embodiment of this application provides a chip system. The chip system includes a processor, and the processor is configured to read and execute a computer program stored in a memory, to execute related functions in any one of the foregoing aspects or the possible implementations of the foregoing aspects. In a possible design, the chip system further includes the memory, and the memory is electrically connected to the processor. Further, In one embodiment, the chip system further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface. The chip system may include a chip, or may include a chip and another discrete device.

For technical effects brought by any implementation of the second aspect, the third aspect, the fourth aspect, the fifth aspect, and the sixth aspect, refer to technical effects brought by corresponding implementations of the first aspect. Details are not described herein again.

It can be learned from the foregoing technical solutions that embodiments of this application have the following advantages:

In the three-dimensional reconstruction method provided in embodiments of this application, after the image of the first object and the camera pose of the image are obtained, the image is input to the deep learning network, and the first normalized object location field NOLF image of the first object at the photographing angle of view of the image is output. The first NOLF image may indicate normalized three-dimensional information of the first object at the photographing angle of view of the image. The first model is determined from the plurality of three-dimensional models in the preset model database based on the first NOLF image. Calculation is performed based on the first model and the camera pose of the image, to determine the pose of the first object. This can implement three-dimensional reconstruction of the first object.

In this solution, when the three-dimensional model is retrieved from the model database, the NOLF image restored from the photographed image by using the deep learning network is used. Therefore, in comparison with the conventional technology, the three-dimensional model does not need to be projected in advance at different locations and angles of view, retrieval and matching are performed based on three-dimensional information and the three-dimensional model, and this solution is accurate.

In addition, in the three-dimensional reconstruction method provided in embodiments of this application, the relative pose of the first object may further be predicted based on the NOLF image and the pixel coordinates of the feature points. The NOLF image of the three-dimensional model in the initial pose in the model database is obtained based on the calculated initial pose, and is compared with the NOLF image of the modeling object. Therefore, the object and the three-dimensional model in the database are represented in the same data form. This can reduce difficulty of retrieving the three-dimensional model and effectively reduce a calculation amount.

DESCRIPTION OF EMBODIMENTS

Figure 1:
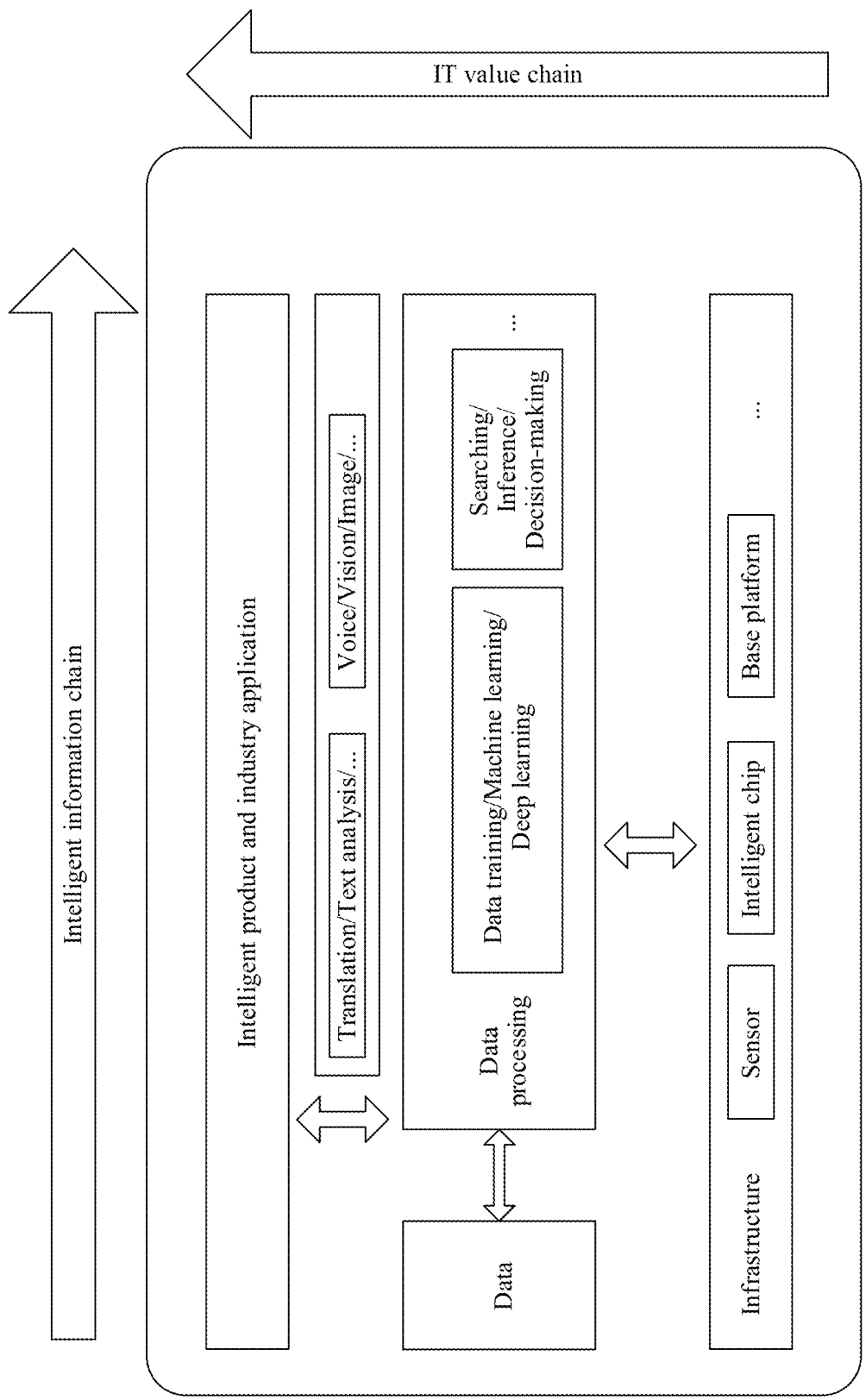
FIG. 1 is a schematic diagram of a main framework of artificial intelligence according to an embodiment of this application.

An embodiment of this application provides a three-dimensional reconstruction method used for three-dimensional reconstruction of an object. This can improve accuracy of model matching.

For ease of understanding, the following briefly describes some technical terms in the embodiments of this application:

1. Three-dimensional model: A three-dimensional model is a polygon representation of an object, and is usually displayed by using a computer or another video device. The displayed object may be an entity in the real world, or may be an imaginary object. Any object that exists in the physical natural world may be represented by a three-dimensional model. In embodiments of this application, a three-dimensional model of an object indicates a three-dimensional structure and size information of the object. Data of the three-dimensional model is stored in a plurality of forms, for example, represented in a form of a three-dimensional point cloud, a grid, or an element. This is not specifically limited herein.

2. Directional normalized three-dimensional model: Size normalization is performed based on a three-dimensional model of an object, and a normalized three-dimensional model is placed in a three-dimensional coordinate system based on a preset main-view direction, and includes information about three-dimensional structure of the object. The preset main-view direction is usually a direction that conforms to a habit of a user and can best reflect a shape feature of an object. For example, for a camera, a photographing button is set to be upward, and a lens direction is set to be a main-view direction. An actual size of the camera is normalized, and scaled to a preset size, to obtain a directional normalized three-dimensional model.

For example, in embodiments of this application, a method for obtaining a directional normalized three-dimensional model is as follows: A main-view direction of an object is preset, a normalized object location field is defined as three-dimensional space whose length, width, and height are both 1, a three-dimensional model of an object is normalized and scaled, and a center of mass is located at a center point of the three-dimensional space, to obtain a directional normalized three-dimensional model.

3. Normalized object location field (NOLF) image, hereinafter referred to as an NOLF image: An NOLF image indicates a normalized three-dimensional point cloud of a visible part of an object or a three-dimensional model at an angle of view. The NOLF image is an image-like data expression form. In other words, each pixel coordinate of the image corresponds to XYZ coordinates of a three-dimensional model stored in normalized three-dimensional space, that is, each pixel coordinate corresponds to one three-dimensional coordinate. Therefore, a correspondence between pixel coordinates of the three-dimensional model in an image and three-dimensional coordinates in the normalized space is established. An NOLF image at a photographing angle of view of an image mentioned in embodiments of this application is a normalized three-dimensional point cloud of a visible part of an object based on a relative pose between a camera and the object at the angle of view when the object is photographed by the camera.

4. Perspective-n-point (PnP) estimation, also referred to as projection N-point estimation: Perspective-n-point estimation means that a projection relationship between N object points in the world and N corresponding image points in an image is calculated, to obtain a camera pose or an object pose.

5. Bounding box: A smallest cuboid that completely contains an object is a three-dimensional bounding box of the object. For an object configured in a three-dimensional coordinate system, a bounding box may be a smallest hexahedron that includes the object and whose side is parallel to a coordinate axis. Corner points of the bounding box are eight vertices of the smallest hexahedron.

6. Key point: The key point in embodiments of this application is a corner point of a three-dimensional bounding box, namely, a cuboid vertex of the three-dimensional bounding box.

7. Camera pose: A pose is a location of a camera in space and a posture of the camera, and may be respectively considered as translation transformation and rotation transformation of the camera from an original reference location to a current location. Similarly, an object pose in this application is a location of an object in space and a posture of the object.

8. Extrinsic parameter of a camera: The extrinsic parameter of the camera is a conversion relationship between a world coordinate system and a camera coordinate system, including a displacement parameter and a rotation parameter. A camera pose may be determined based on the extrinsic parameter of the camera.

9. Category: Image recognition may be performed through deep learning, to identify a category of an object in an image, namely, object classification. The category of the object may be, for example, a desk, a chair, a cat, a dog, or a car.

In a three-dimensional reconstruction method provided in embodiments of this application, a model database needs to be constructed in advance based on an application scenario, to store three-dimensional information of a to-be-modeled object. A category may be set for a three-dimensional model based on a type of an object covered in the scenario. For example, three-dimensional reconstruction is performed in an indoor home scenario. Three-dimensional models of all furniture that may appear need to be pre-stored in a database. Categories are set based on types of the furniture, for example, a "chair", a "table", a "tea table", and a "bed". In one embodiment, if there are a large quantity of objects of a common type in the scenario, a second-level category may further be set, for example, chairs of a plurality of types, for example, a "stool", an "armchair", and a "sofa chair".

10. Image mask: A selected image, graph, or object is used to completely or partially block a to-be-processed image, to control an area or a process of image processing. In embodiments of this application, the image mask is used to extract an interested region, for example, a partial image of a first target object in an image, and a mask of the interested region is multiplied by the to-be-processed image, to obtain an image of the interested region. A value of the image of the interested region remains unchanged, and a value of an image outside the interested region is 0.

The following describes embodiments of this application with reference to the accompanying drawings. It is clear that the described embodiments are merely a part rather than all of the embodiments of this application. A person of ordinary skill in the art may learn that, with technology development and emergence of a new scenario, the technical solutions provided in embodiments of this application are also applicable to a similar technical problem.

The term "and/or" in embodiments of this application may describe an association relationship between associated objects and may indicate three relationships. For example, A and/or B may indicate the following cases: Only A exists, both A and B exist, and only B exists, where A and B may be singular or plural. In addition, the character "/" in this application usually indicates an "or" relationship between the associated objects. In this application, "at least one" means one or more, and "a plurality of" means two or more. "At least one (piece) of the following" or a similar expression thereof means any combination of these items, including any combination of singular items (pieces) or plural of items (pieces). For example, at least one of a, b, or c may indicate: a, b, c, a and b, a and c, b and c, or a, b, and c, where a, b, and c may be singular or plural.

In the specification, claims, and the accompanying drawings in this application, terms "first", "second", and the like are intended to distinguish between similar objects, but do not necessarily indicate a specific order or sequence. It should be understood that the data termed in such a way are interchangeable in proper circumstances so that embodiments described herein can be implemented in other orders than the order illustrated or described herein. In addition, the terms "include", "contain", and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Naming or numbering of operations in this application does not mean that the operations in a method procedure need to be performed in a time/logical order indicated by the naming or numbering. An execution order of the operations in the procedure that have been named or numbered can be changed based on a technical objective to be achieved, provided that same or similar technical effects can be achieved.

FIG. 1 is a schematic diagram of an artificial intelligence main framework. The main framework describes an overall working procedure of an artificial intelligence system, and is applicable to a requirement of a general artificial intelligence field.

The following describes the foregoing main framework of artificial intelligence from two dimensions: an "intelligent information chain" (a horizontal axis) and an "IT value chain" (a vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry from an underlying infrastructure and information (providing and processing technology implementation) of human intelligence to an industrial ecological process of a system.

(1) Infrastructure

The infrastructure provides computing capability support for the artificial intelligence system, implements communication with the external world, and implements support by using a base platform. A sensor is configured to communicate with the outside. A computing capability is provided by an intelligent chip (a hardware acceleration chip, for example, a central processing unit (CPU), a neural-network processing unit (NPU), a graphics processing unit (GPU), an application-specific integrated circuit (ASIC), or a field-programmable gate array (FPGA)). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data at an upper layer of the infrastructure is used to indicate a data source in the field of artificial intelligence. The data relates to a graph, an image, a voice, and text, further relates to Internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may mean performing symbolic and formalized intelligent information modeling, extraction, preprocessing, training, and the like on data.

Inference is a process in which a human intelligent inferring manner is simulated in a computer or an intelligent system, and machine thinking and problem resolving are performed by using formal information according to an inferring control policy. A typical function is searching and matching.

Decision-making is a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, such as translation, text analysis, computer vision processing, speech recognition, and image recognition.

(5) Intelligent Product and Industry Application

The intelligent product and the industry application are a product and an application of the artificial intelligence system in various fields, and are package of an overall solution of the artificial intelligence, so that decision-making for intelligent information is productized and an application is implemented. Application fields mainly include smart manufacturing, smart transportation, smart home, smart health care, smart security protection, autonomous driving, a safe city, a smart terminal, and the like.

A method for implementing three-dimensional reconstruction of an object by using a single two-dimensional image described in this application has wide application. For example, in base station site survey, a digital site is constructed by using three-dimensional reconstruction, so that automatic site design, online guidance for device installation, radio signal simulation, and the like can be implemented. In terminal augmented reality (AR) or virtual reality (VR) technology, difficulty of three-dimensional content creation lies in three-dimensional modeling.

Figure 2:
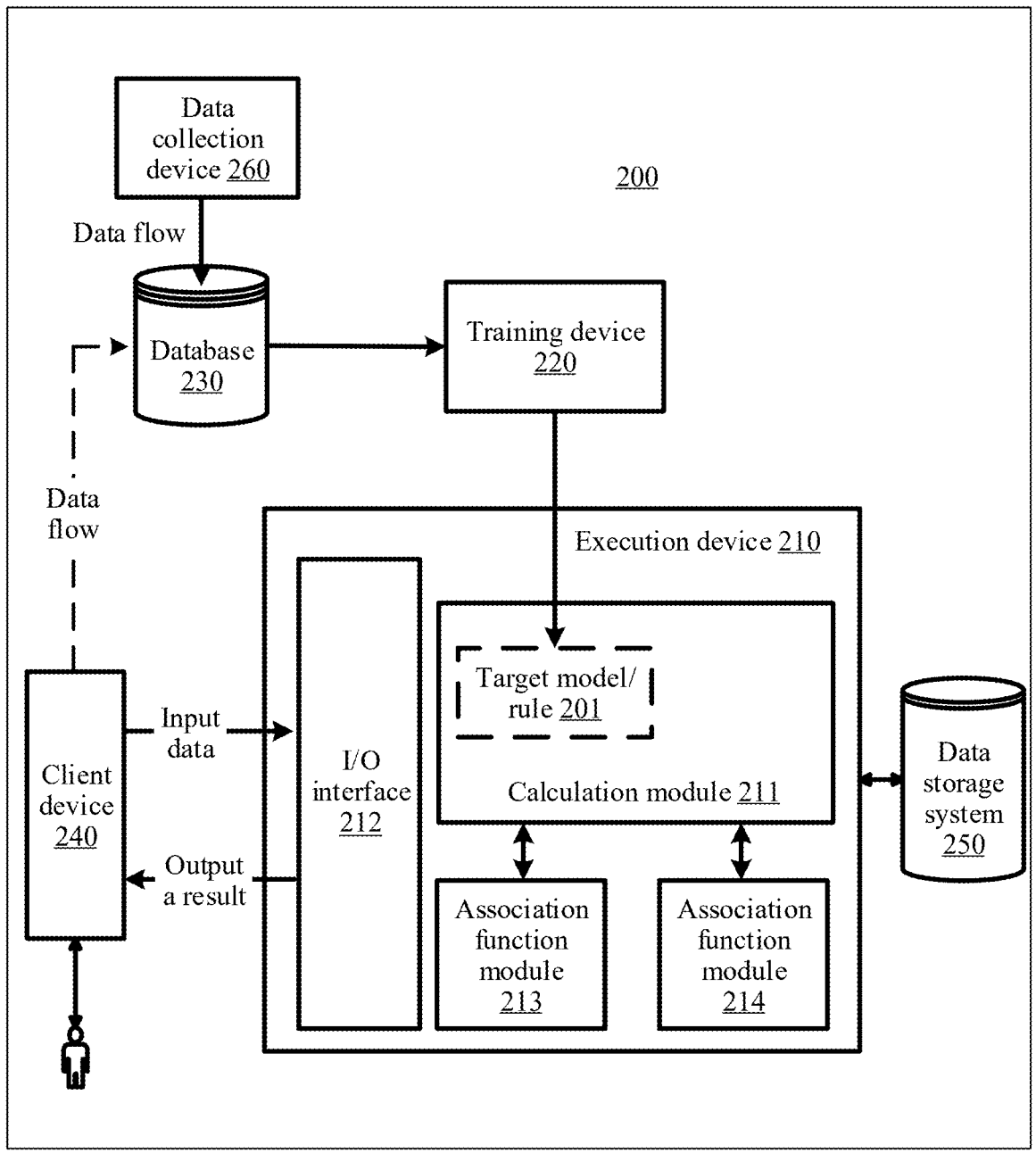
FIG. 2 is a schematic diagram of an application environment according to an embodiment of this application.

Refer to FIG. 2. An embodiment of this application provides a system architecture 200. A data collection device 260 is configured to collect an image and store the image in a database 230, and a training device 220 generates a target model/rule 201 based on image data maintained in the database 230. The following describes in more detail how the training device 220 obtains the target model/rule 201 based on the image data. The target model/rule 201 can be used in application scenarios such as image recognition, three-dimensional reconstruction, and virtual reality.

The target model/rule 201 may be obtained based on a deep neural network. The following describes the deep neural network.

Work at each layer of the deep neural network may be described by using a mathematical expression $\vec{y} = a(W \cdot \vec{x} + b)$. From a physical layer, work at each layer of the deep neural network may be understood as completing transformation from input space to output space (namely, from row space to column space of a matrix) by performing five operations on the input space (a set of input vectors). The five operations are as follows: 1. dimension increasing/dimension reduction; 2. scaling up/scaling down; 3. rotation; 4. translation; and 5. "bending". The operation 1, the operation 2, and the operation 3 are performed by $W \cdot \vec{x}$, the operation 4 is performed by +b, and the operation 5 is performed by a( ). The word "space" is used herein for expression because a classified object is not a single thing, but a type of things. Space refers to a collection of all individuals of such type of things. W is a weight vector, and each value in the vector indicates a weight value of one neuron in the neural network at this layer. The vector W determines space transformation from the input space to the output space described above. In other words, a weight W at each layer controls how to transform space. A purpose of training the deep neural network is to finally obtain a weight matrix (a weight matrix formed by vectors W at a plurality of layers) at all layers of a trained neural network. Therefore, a training process for the neural network is essentially a manner of learning control of space transformation, and more specifically, learning a weight matrix.

Because an output of the deep neural network is expected to be as much as possible close to a value that actually wants to be predicted, a current predicted value of the network and an expected target value are compared, so that a weight vector of each layer of the neural network can be updated based on a difference between the predicted value and the target value (certainly, there is usually an initialization process before first updating, to be specific, a parameter is preconfigured for each layer of the deep neural network). For example, if the predicted value of the network is large, the weight vector is adjusted to obtain a smaller predicted value, and is continuously adjusted until the neural network can predict the expected target value. Therefore, "how to obtain, through comparison, the difference between the predicted value and the target value" needs to be predefined. This is a loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

The target model/rule obtained by the training device 220 may be applied to different systems or devices. In FIG. 2, an I/O interface 212 is configured for an execution device 210, to exchange data with an external device. A "user" may input data to the I/O interface 212 by using a client device 240.

The execution device 210 may invoke data, code, and the like in a data storage system 250, or may store data, instructions, and the like in the data storage system 250.

A calculation module 211 processes input data by using the target model/rule 201. Three-dimensional modeling is used as an example, the calculation module 211 may parse an input image or an image sequence, and restore depth information of a target.

An association function module 213 may preprocess image data in the calculation module 211.

An association function module 214 may preprocess image data in the calculation module 211.

Finally, the I/O interface 212 returns a processing result to the client device 240, and provides the processing result for the user.

More deeply, the training device 220 may generate, for different targets, corresponding target models/rules 201 based on different data, to provide a better result for the user.

In a case shown in FIG. 2, the user may manually specify data to be input to the execution device 210, for example, may operate on an interface provided by the I/O interface 212. In another case, the client device 240 may automatically input data to the I/O interface 212 and obtain a result. If the client device 240 needs to obtain permission of the user for automatically inputting the data, the user may set corresponding permission on the client device 240. The user may view, on the client device 240, a result output by the execution device 210, and a specific presentation form may be a specific manner, for example, display, a sound, or an action. The client device 240 may be also used as a data collection end to store the collected training data in the database 230.

It should be noted that FIG. 2 is merely a schematic diagram of a system architecture according to an embodiment of this application. A location relationship between devices, components, modules, and the like shown in the figure does not constitute any limitation. For example, in FIG. 2, the data storage system 250 is an external storage device relative to the execution device 210, and in another case, the data storage system 250 may be alternatively disposed in the execution device 210. For another example, in FIG. 2, the training device 220, the execution device 210, and the client device 240 are independent devices. In another case, the training device 220 and the execution device 210 may be a same physical device, and the physical device may implement all functions of the training device 220 and the execution device 210. In one embodiment, the execution device 210 and the client device 240 may alternatively be a same physical device, and the physical device may implement all functions of the execution device 210 and the client device 240. In one embodiment, the training device 220, the execution device 210, and the client device 240 are a same physical device, and the physical device implements all functions of the training device 220, the execution device 210, and the client device 240. A specific scenario architecture in this embodiment of this application is not limited herein.

In embodiments of this application, a deep neural network used to predict an NOLF image of a target from a two-dimensional image may be, for example, a convolutional neural network (CNN). The CNN is a deep neural network with a convolutional structure, and is a deep learning (deep learning) architecture. In the deep learning architecture, multi-layer learning is performed at different abstract levels by using a machine learning algorithm. As the deep learning architecture, the CNN is a feed-forward (feed-forward) artificial neural network. Image processing is used as an example. Neurons in the feed-forward artificial neural network respond to an overlapping area in an image input to the CNN. It is clear that the deep neural network may be another type. A type of the deep neural network is not limited in this application.

Figure 3:
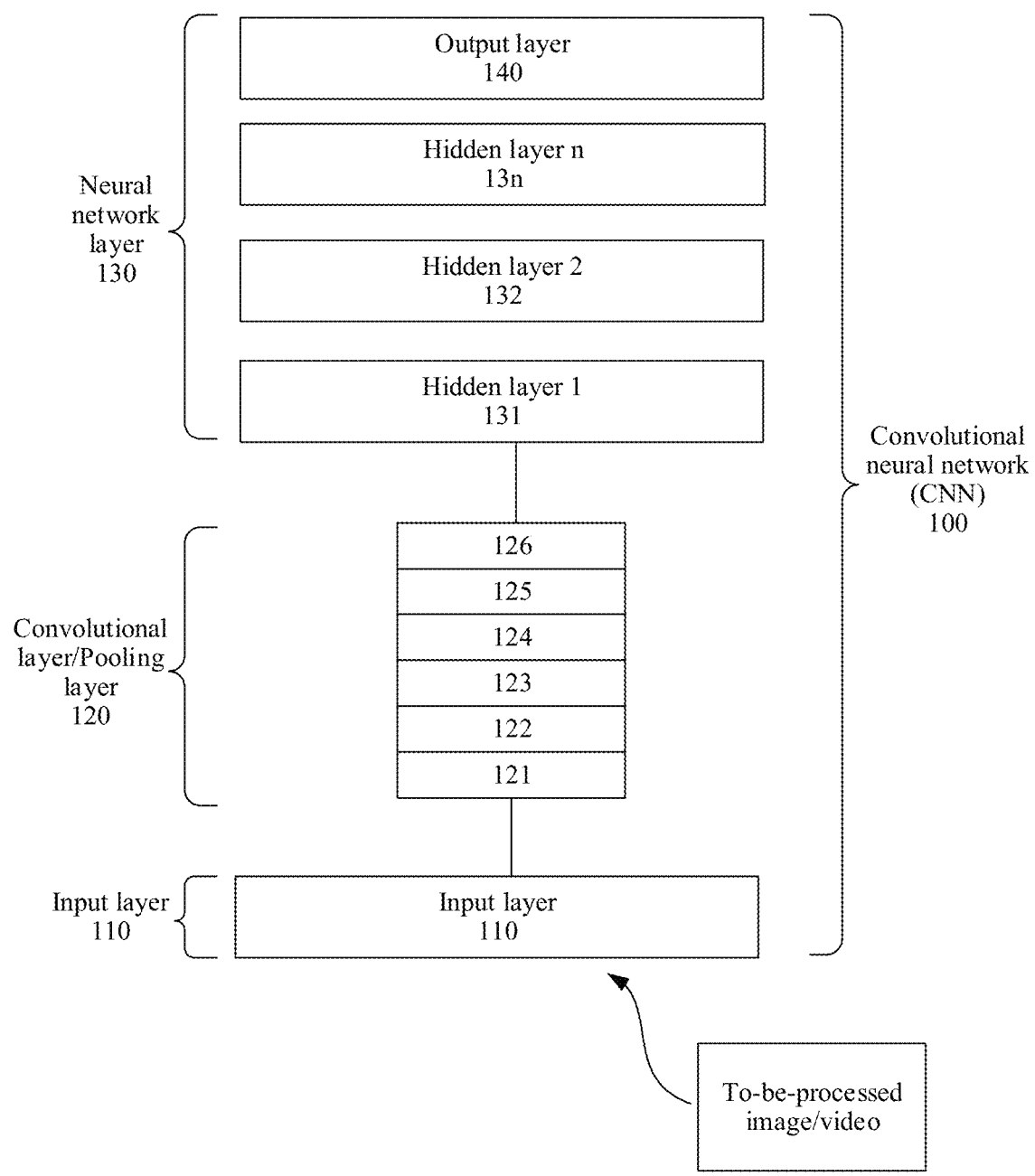
FIG. 3 is a schematic diagram of a structure of a convolutional neural network according to an embodiment of this application.

As shown in FIG. 3, an CNN 100 may include an input layer 110, a convolutional layer/pooling layer 120, and a neural network layer 130. The pooling layer is optional.

Convolutional Layer/Pooling Layer 120:

Convolutional Layer:

As shown in FIG. 3, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. To be specific, an output of a convolutional layer may be used as an input of a subsequent pooling layer, or may be used as an input of another convolutional layer to continue to perform a convolution operation.

The convolutional layer 121 is used as an example. The convolutional layer 121 may include a plurality of convolution operators. A convolution operator is also referred to as a kernel. In image processing, the convolution operator functions as a filter that extracts specific information from an input image matrix. The convolution operator may be essentially a weight matrix, and the weight matrix is usually predefined. In a process of performing a convolution operation on an image, the weight matrix is usually used to process pixels at a granularity level of one pixel (or two pixels, which depends on a value of a stride) in a horizontal direction on the input image, to extract a specific feature from the image.

When the convolutional neural network 100 includes a plurality of convolutional layers, a larger quantity of general features are usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem. For ease of describing a network structure, a plurality of convolutional layers may be referred to as a block.

Pooling Layer:

Because a quantity of training parameters usually needs to be reduced, the pooling layer usually needs to be periodically introduced after a convolutional layer. To be specific, for the layers 121 to 126 in the convolutional layer/pooling layer 120 shown in FIG. 3, one convolutional layer may be followed by one pooling layer, or a plurality of convolutional layers may be followed by one or more pooling layers. During image processing, the pooling layer is only used to reduce a space size of an image.

Neural Network Layer 130:

After processing is performed at the convolutional layer/pooling layer 120, the convolutional neural network 100 still cannot output required output information. Therefore, the neural network layer 130 may include a plurality of hidden layers (131, 132, . . . , and 13n shown in FIG. 3) and an output layer 140. Parameters included in the plurality of hidden layers may be obtained through pre-training based on related training data of a specific task type. For example, the task type may include image recognition, image classification, super-resolution image reconstruction, and the like.

In other words, after the plurality of hidden layers in the neural network layer 130, a last layer of the entire convolutional neural network 100 is the output layer 140.

It should be noted that the convolutional neural network 100 shown in FIG. 3 is merely used as an example of a convolutional neural network. During specific application, the convolutional neural network may alternatively exist in a form of another network model, for example, a plurality of parallel convolutional layers/pooling layers shown in FIG. 4, and extracted features are all input to the entire neural network layer 130 for processing.

Figure 5:
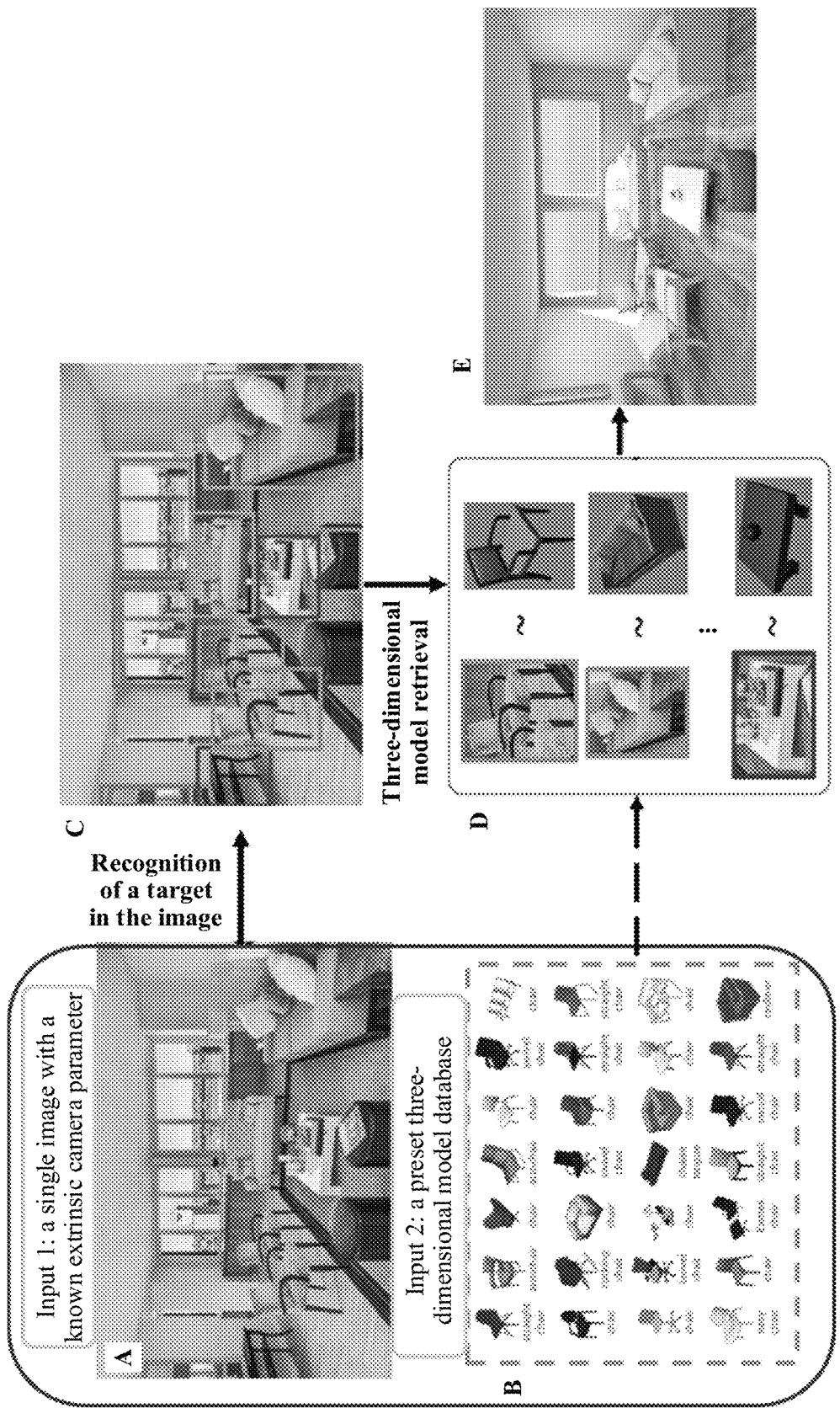
FIG. 5 is a schematic diagram of an application scenario of a three-dimensional reconstruction method according to an embodiment of this application.

FIG. 5 is a schematic diagram of an application scenario of a three-dimensional reconstruction method according to an embodiment of this application.

As shown in FIG. 5, A is a single two-dimensional image obtained by photographing a to-be-modeled scenario, B is a pre-constructed three-dimensional model database, C is a plurality of target objects in the scenario that are recognized from A, D are three-dimensional models, corresponding to the plurality of target objects, obtained by performing model retrieval from B, and E is three-dimensional data of the scenario obtained through three-dimensional reconstruction of the target object based on the matched three-dimensional model.

In the conventional technology, image analysis is performed, based on a pre-constructed model database, on a single scene image input by a user, to obtain a partial image of a target model. Model retrieval is performed in the pre-constructed model database, to determine a matched model, and implement three-dimensional reconstruction. The pre-constructed model database projects a three-dimensional model based on different locations and angles in virtual three-dimensional space, and replaces the three-dimensional model with a group of projection images at a plurality of angles. In this way, a two-dimensional-three-dimensional retrieval issue in model retrieval is converted into a two-dimensional-two-dimensional similarity measurement issue. When a projection image of a three-dimensional model at an angle of view is similar to a to-be-retrieved partial image, it is considered that the three-dimensional model corresponding to the projection image is a retrieval result.

In the conventional technology, a preset three-dimensional model is projected at a preset location and angle, and a group of projection images at a plurality of angles in the model database indicate one three-dimensional model. However, during actual photographing, an angle of view of a scene image is usually random, and does not completely match a preset location and angle of an obtained projection image in the model database. Therefore, accuracy of model retrieval is low.

To increase a probability that a projection angle of view of a three-dimensional model is similar to an angle of view of a to-be-modeled target in a photographed image, a projection location and a projection angle of the three-dimensional model need to be added. Consequently, a quantity of samples is large, and calculation costs are high.

In addition, a projection image of the three-dimensional model in virtual space differs greatly from a scene image in real space in key elements such as a light condition, a background, and a texture color. In the conventional technology, retrieval of a virtual image by using a real image is restricted by the foregoing factors. Consequently, robustness of a retrieval result needs to be greatly improved.

In conclusion, it is difficult to achieve a good balance between key modeling indicators such as modeling efficiency, modeling costs, and modeling accuracy in the existing three-dimensional modeling technologies. For consumers and developers who want to use three-dimensional information and three-dimensional applications, how to quickly and simply obtain a high-precision and available three-dimensional scenario model with low costs is a key problem that needs to be continuously broken through.

An embodiment of this application provides a three-dimensional reconstruction method, to perform three-dimensional reconstruction based on a two-dimensional image and a pre-constructed model database, and modeling precision is high.

Figure 6:
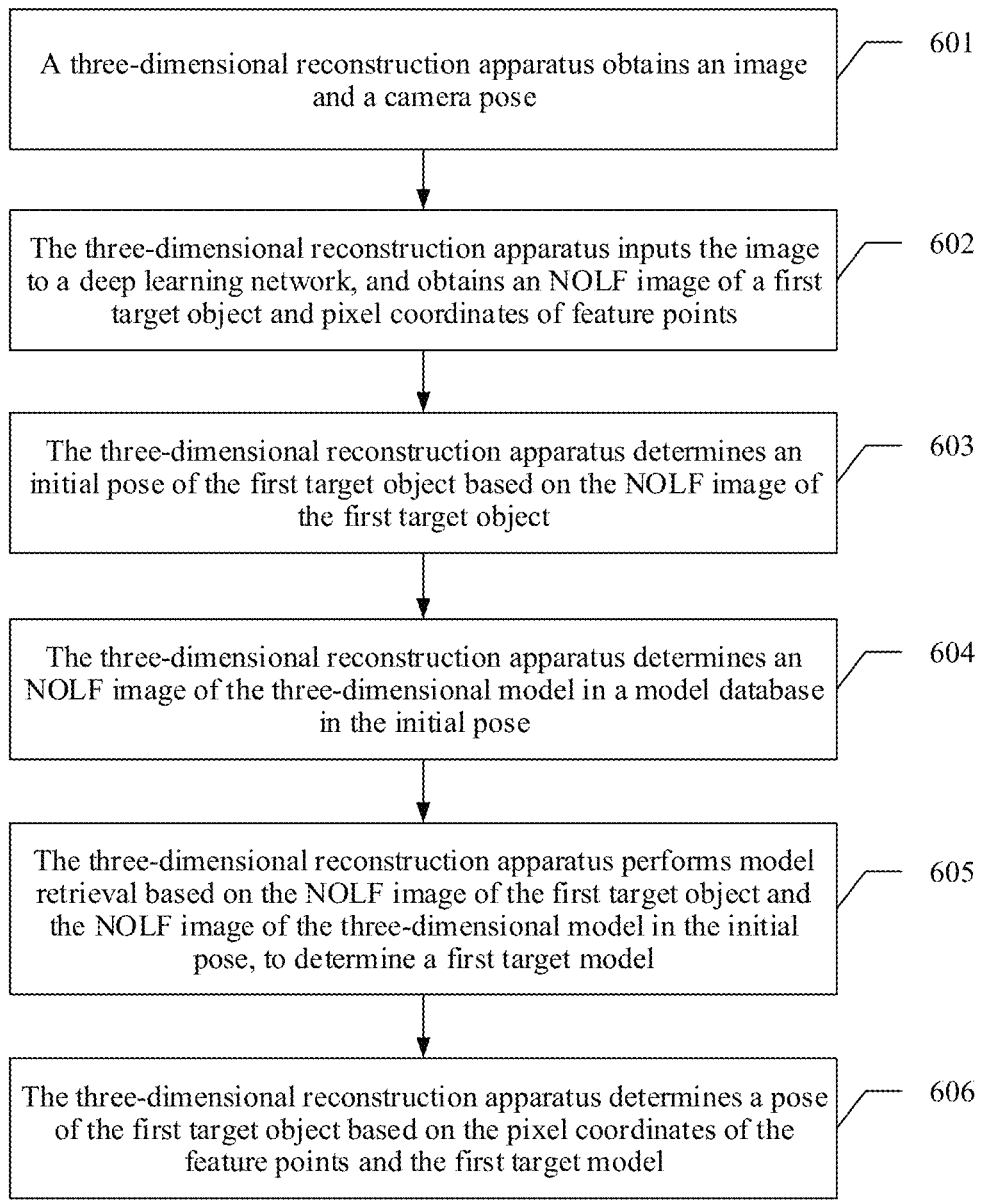
FIG. 6 is a schematic diagram of an embodiment of a three-dimensional reconstruction method according to an embodiment of this application.

FIG. 6 is a schematic diagram of an embodiment of a three-dimensional reconstruction method according to an embodiment of this application.

For a target object that may appear in a scenario, a model database is constructed in advance. Each object corresponds to one three-dimensional model, and the model database includes a plurality of three-dimensional models. The three-dimensional model includes three-dimensional geometric information of an object, and specifically, includes a geometric structure and size information. In one embodiment, the three-dimensional model further includes a texture feature of the object. In one embodiment, the three-dimensional model in the model database carries a label of a category of an object. For example, categories of chairs of various styles and shapes are all a "chair".

An indoor scenario is used as an example. Models of common furniture may first be constructed, for example, tea tables, dining tables, and chairs of various styles that may appear in the scenario. For a base station, models of common devices may first be constructed, for example, antenna devices of various models. Based on understanding of a to-be-constructed scenario, prior information is provided, to implement reconstruction of a three-dimensional scenario based on information provided by a single two-dimensional image.

601: A three-dimensional reconstruction apparatus obtains an image and a camera pose.

The three-dimensional reconstruction apparatus obtains an image of a first target object and a camera pose corresponding to the image.

The image is a two-dimensional image obtained by photographing a target scenario including the first target object. The first target object is also referred to as a modeling target in this embodiment of this application. The image is photographed by an image collection device, and may be a common camera or a panoramic camera. The image collection device may be a component disposed in the three-dimensional reconstruction apparatus, or may be an independent device connected to the three-dimensional reconstruction apparatus in a wired or wireless manner. A specific type and a device form of the image collection device are not limited in this embodiment of this application. The image may be a panoramic image that is collected by the panoramic camera and whose horizontal angle of view is 360 degrees, an ultra-wide-angle image, or a central projection image photographed by the common camera. This is not specifically limited herein. In addition, the three-dimensional reconstruction method provided in this embodiment of this application can implement three-dimensional reconstruction based on a single image. However, when information about a target scenario cannot be completely collected from a single central projection image, a plurality of images may be collected. This is not specifically limited herein.

The camera pose corresponding to the image is a location and a pose of a camera when the camera photographs the image. When a reference coordinate system is set, the camera pose may be determined based on translation and rotation relative to the reference coordinate system. A manner of obtaining the camera pose corresponding to the image is not limited herein.

602: The three-dimensional reconstruction apparatus inputs the image to a deep learning network, and obtains an NOLF image of the first target object and pixel coordinates of feature points.

The three-dimensional reconstruction apparatus inputs, to the deep learning network, the image obtained in operation 601, and obtains the NOLF image of the first target object at a photographing angle of view of the image and the pixel coordinates of the feature points of the first target object in the image.

The feature points of the first target object in the image are used to determine a pose of the first target object after a target three-dimensional model in a three-dimensional model database is determined. To calculate the pose of the first target object, at least four feature points need to be determined, and object points corresponding to the four feature points (image points) are not coplanar in three-dimensional space. A specific quantity of feature points is not limited herein. An image point in an image obtained through photographing by a camera corresponds to a point in three-dimensional space, and is referred to as an object point. It should be noted that the feature points of the first target object in the image may be located in an image region of the first target object, and the corresponding object points are located in the first target object. Alternatively, the feature points of the first target object may be located outside the image region of the first target object. For example, the feature points may be points that are projected, on the image, by corner points of a bounding box of the target object. Herein, the corner points of the bounding box of the target object do not correspond to a physical object in photographing space, and only indicate one location in three-dimensional space.

Figure 7:
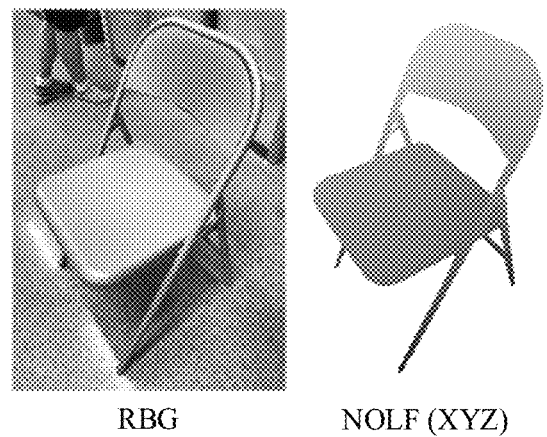
FIG. 7 is a schematic diagram of an embodiment of an NOLF image of a target object according to an embodiment of this application.

For the NOLF image of the first target object that is output by the deep learning network, refer to FIG. 7. FIG. 7 is a schematic diagram of an embodiment of the NOLF image of the target object according to an embodiment of this application. The NOLF image of the first target object at the photographing angle of view in the image is output based on a two-dimensional RGB image. The NOLF image may indicate normalized three-dimensional information of the first target object at the photographing angle of view of the image. The NOLF image is a two-dimensional image. Each pixel point in the NOLF image stores information about three dimensions, X, Y, and Z, of an object point corresponding to the pixel. In one embodiment, the NOLF image may be expressed by using a two-dimensional RGB image. Three color channels in the RGB image separately correspond to information about one dimension in a three-dimensional coordinate system.

In one embodiment, the three-dimensional reconstruction apparatus may output the NOLF image of the first target object and the pixel coordinates of the key points of the first target object by using one deep learning network; or may separately obtain the NOLF image of the first target object and the pixel coordinates of the key points of the first target object by using different deep learning networks. This is not specifically limited herein.

In one embodiment, the three-dimensional reconstruction apparatus may further obtain a category of the first target object by using the deep learning network. The category is used to determine, from the model database during model retrieval, a model corresponding to the category. For example, the first target object is recognized as a chair. There may be a plurality of types of models in the model database, for example, a "table", a "chair", a "tea table", and a "bed". If the obtained category of the first target object is the "chair", the model of the object may be limited to three-dimensional models whose types are the "chair", and three-dimensional models of another type do not need to be retrieved.

In one embodiment, the three-dimensional reconstruction apparatus may further obtain a mask of the first target object by using the deep learning network. The mask may be used to optimize the NOLF image, to improve accuracy of the NOLF image.

Figure 8:
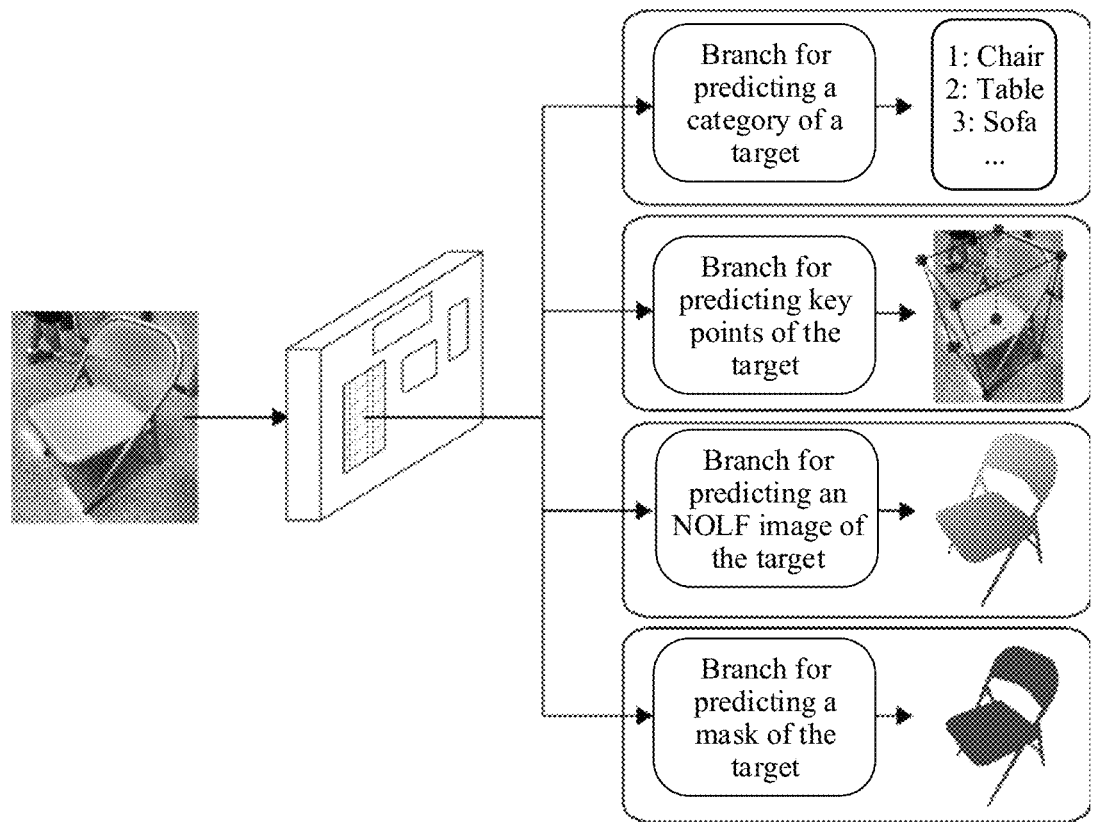
FIG. 8 is a schematic diagram of an architecture of a deep learning network in a three-dimensional reconstruction method according to an embodiment of this application.

For example, FIG. 8 is a schematic diagram of an architecture of the deep learning network in the three-dimensional reconstruction method according to an embodiment of this application.

In FIG. 8, a convolutional neural network for predicting an NOLF image, key points, and an instance segmentation mask based on a modeling object in a two-dimensional image is described. An input is a two-dimensional RGB image including a target modeling object. Based on the image, the CNN can predict a mask, an NOLF image, and pixel coordinates of eight key points of the target modeling object. The NOLF image includes three-dimensional information of the target modeling object at a photographing angle of view of the image. The eight key points are corner points of a bounding box of the target modeling object, and eight corner points of a bounding box of a three-dimensional model, in space, corresponding to the target modeling object are projected on the input image based on an accurate pose, to obtain the pixel coordinates of the key points. In one embodiment, the deep learning network predicts a category and a mask of the target object based on a general-purpose instance segmentation architecture (Mask R-CNN framework). In one embodiment, the convolutional neural network may alternatively predict a category of the target modeling object by using a detection branch, and a model retrieval range may be narrowed down based on a label of a preset type of each three-dimensional model in the three-dimensional model database.

A scenario usually includes a plurality of target objects, and an obtained image includes images of the plurality of target objects. In one embodiment, the three-dimensional reconstruction apparatus inputs the image obtained in operation 601 to the deep learning network, so that the plurality of target objects in the image can be recognized, and an NOLF image of each target object is generated. In one embodiment, an image region of the first target object in the image is usually a partial region of the image. The three-dimensional reconstruction apparatus recognizes all to-be-reconstructed three-dimensional target objects in the image by parsing image information, and obtains the partial image of the target object. Each partial image corresponds to one target object, and a specific quantity of partial images obtained from the image is not limited herein. In one embodiment, the three-dimensional reconstruction apparatus may first determine the partial image of the target object from the image, and then input the partial image to the deep learning network. This is not specifically limited herein.

The deep learning network is a pre-trained model. For a training method, refer to subsequent embodiments.

603: The three-dimensional reconstruction apparatus determines an initial pose of the first target object based on the NOLF image of the first target object.

A correspondence between the image pixel coordinates of the NOLF image and three-dimensional coordinates indicated by the NOLF image is established based on the NOLF image obtained in operation 602. For example, four points, in the NOLF image, that are not coplanar in three-dimensional space are randomly sampled, so that four pairs of correspondences between two-dimensional pixel coordinates and three-dimensional coordinates can be established. In this way, a first relative pose of a modeling target in normalized object space can be obtained by solving a PnP, and the first relative pose is the initial pose.

In one embodiment, to improve calculation precision of the initial pose, a plurality of initial poses may be obtained through a plurality of times of sampling, clustering is performed based on the plurality of initial poses, and an initial pose corresponding to a clustering center is used as an initial pose of the directional normalized three-dimensional model of the target object at the photographing angle of view of the image. The following provides descriptions in detail.

When a region in which the modeling target in the two-dimensional image is located in the NOLF image is known, any pixel coordinate pi in the NOLF image corresponds to one three-dimensional point Pi in normalized space, so that a series of correspondences between two-dimensional pixel locations and locations in three-dimensional space. A PnP is solved based on the correspondences, to obtain a series of relative poses of corresponding three-dimensional models in the normalized space. A specific process is as follows: It is assumed that a pixel region of the NOLF image is R, and four pixel points and corresponding three-dimensional coordinates are randomly sampled from R. The PnP is solved based on the four pairs of the 2D-3D (two-dimensional-three-dimensional) correspondences, to obtain a pose $H_j$ in the normalized space, and alignment and score evaluation are performed on poses $H_j$ by using the following formula:

$$\text{Score}(H_j) = \sum_{p_j \in R} [|p_j - AH_j P_j| < \text{threshold}]$$

$P_j$ is a normalized three-dimensional coordinate corresponding to a pixel point pj, A is an intrinsic parameter matrix of the camera, and threshold is a defined threshold. The score evaluation formula is used to measure a quantity of pixels, in the pose $H_j$, corresponding to three-dimensional coordinates that are reprojected, and a pixel error is less than threshold, so that a confidence of each pose is measured. Maximum optimization is performed on the foregoing formula by using a preemptive random sample consensus (preemptive RANSAC), the foregoing sampling process is repeated, and finally, assumed poses that a score of each pose ranks top 10 are used as an initial pose set for clustering. An assumed pose corresponding to the clustering center is used as the initial pose of the target modeling object in the normalized space.

604: The three-dimensional reconstruction apparatus determines an NOLF image of the three-dimensional model in the model database in the initial pose.

NOLF images of all three-dimensional models in the preset model database may be projected by using the initial pose obtained in operation 603, and NOLF images of all candidate three-dimensional models in the database in the initial pose are obtained through rendering. Then, similarity is detected based on the NOLF images in the initial pose, and the NOLF images in the initial pose are used as an information representation of the three-dimensional model database, so that two-dimensional image information of the first target object and three-dimensional model information in the model database are represented in a same data form.

In one embodiment, if the category of the first target object is obtained in operation 602, a three-dimensional model set belonging to the category may be selected from the three-dimensional model database based on the category. In addition, a normalized location field image of a three-dimensional model in the initial pose is obtained through rendering by using the initial pose determined in operation 603, where a type of the three-dimensional model is the same as a type of the target modeling object.

605: The three-dimensional reconstruction apparatus performs model retrieval based on the NOLF image of the first target object and the NOLF image of the three-dimensional model in the initial pose, to determine a first target model.

Similarity is detected between the NOLF image, obtained in operation 602, of the first target object and the NOLF image, obtained in operation 604, of the three-dimensional model in the initial pose, and a three-dimensional model corresponding to the NOLF image with a highest similarity is determined as the first target model.

Figure 9:
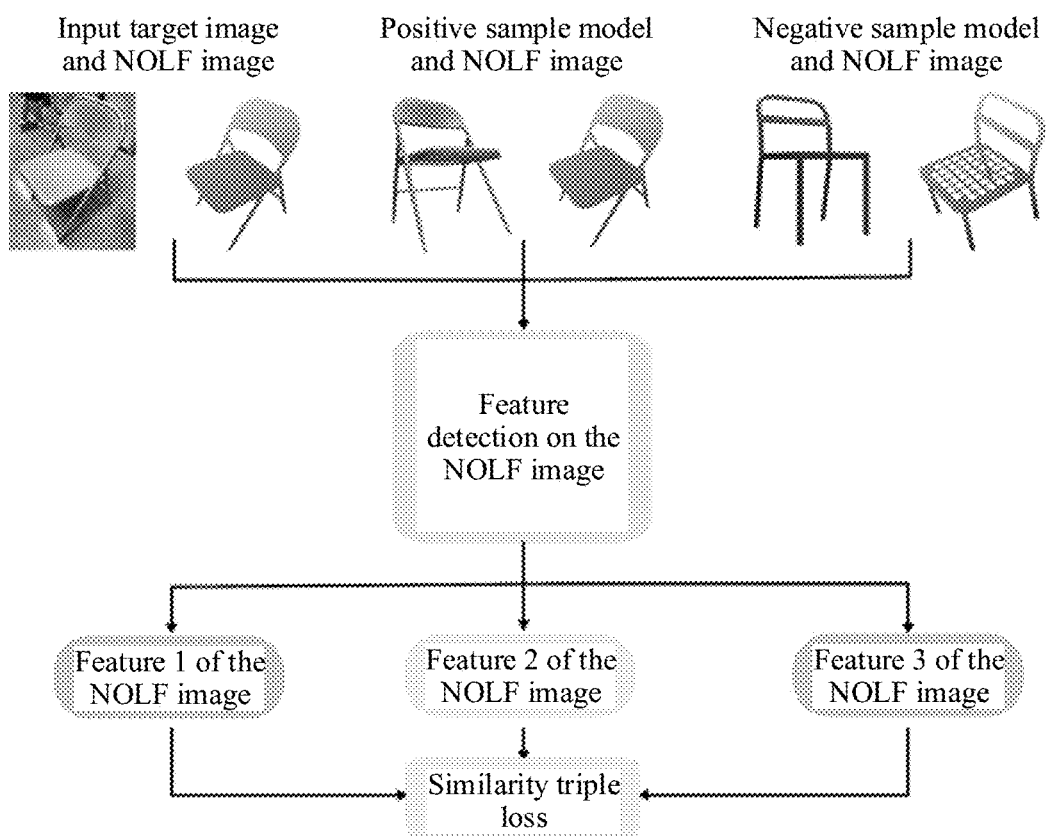
FIG. 9 is a schematic diagram of an embodiment of similarity detection according to an embodiment of this application.

There are a plurality of similarity detection methods. This is not limited herein. For example, FIG. 9 is a schematic diagram of an embodiment of similarity detection according to an embodiment of this application. A triple relationship is established based on the NOLF image. In other words, the NOLF image predicted by the target modeling object in the two-dimensional image is in a positive correlation with the NOLF image of the three-dimensional model corresponding to the target modeling object, and an NOLF image of the three-dimensional model not corresponding to the target modeling object is in a negative correlation. In other words, in feature space, a shorter Euclidean distance between the target modeling object and the corresponding three-dimensional model is better, and a longer Euclidean distance between the target modeling object and the non-corresponding three-dimensional model is better. Therefore, a similarity triple loss function of an NOLF feature descriptor is expressed as:

$$\sum_{(u,v_+,v_-)} [\|f(u) - f(v_+)\| - \|f(u) - f(v_-)\| + m]$$

u is a target modeling object, $v_+$, $v_-$ are respectively a positive sample and a negative sample of a three-dimensional model corresponding to u, f is a CNN-based NOLF feature descriptor, (u, $v_+$, $v_-$) indicates a triple relationship, f(u) indicates a CNN-based NOLF feature descriptor of the target modeling object, $f(v_+)$ indicates a CNN-based NOLF feature descriptor of the positive sample of the three-dimensional model, $f(v_-)$ indicates a CNN-based NOLF feature descriptor of the negative sample of the three-dimensional model, and m is a minimum Euclidean distance. Specifically, m>0, a specific value of m is not limited herein, and $\|.\|$ indicates a Euclidean distance between two sample points in the feature space.

In this embodiment of this application, retrieval is performed based on the NOLF image, and beneficial effects are as follows:

1. A three-dimensional model does not need to be projected in advance at different locations and angles of view, and a data amount in a three-dimensional model retrieval process can be reduced.
2. In this operation, an NOLF image of the three-dimensional model in the model database in the initial pose is obtained based on the calculated initial pose, and then is compared with the NOLF image of the modeling object. Although the obtained initial pose is not necessarily an accurate pose of the target object, similarity detection performed on the NOLF image determined based on the initial pose can reduce difficulty of retrieval.
3. In this operation, during three-dimensional model retrieval, a two-dimensional modeling object and an object in a preset three-dimensional model database are represented in a same data form: an NOLF image, and the data form is irrelevant to a light condition of a modeling target in a real image and a texture detail of a three-dimensional model. The NOLF image implies a three-dimensional shape and geometric information of the object. This facilitates similarity comparison between objects in feature space. Correspondingly, in a conventional method, a similarity between a real image of a target modeling object and a three-dimensional model virtual projection is usually measured. However, the real image and the virtual projection differ greatly in conditions such as light, a texture, and a background, and cross-domain (cross-domain) retrieval is difficult.

606: The three-dimensional reconstruction apparatus determines the pose of the first target object based on the pixel coordinates of the feature points and the first target model.

The pose of the first target object is determined based on the pixel coordinates, determined in operation 602, of the feature points of the first target object and the first target model determined in operation 605.

The pose of the first target object that is relative to the camera during photographing may be determined by using the PnP solution and based on the pixel coordinates of the feature points and three-dimensional coordinates of feature points corresponding to the first target model. In one embodiment, if the feature points are eight key points, because the predicted eight key points are in a one-to-one correspondence with the retrieved corner points of the bounding box of the three-dimensional model, a relative location relationship between the camera and the three-dimensional model when the two-dimensional image is photographed may be determined by using the PnP solution.

Because an extrinsic camera parameter for photographing the two-dimensional image is known, that is, a pose of the camera in real three-dimensional space is known, an absolute pose of the three-dimensional model corresponding to the target modeling object in the real three-dimensional space can be restored based on the relative location relationship between the camera and the three-dimensional model that is determined by using the PnP solution. Three-dimensional reconstruction of a target to-be-modeled object may be implemented based on the first target model determined through model retrieval and the absolute pos of the target modeling object. The foregoing operations are repeated for all target to-be-modeled objects in the three-dimensional scenario, to implement modeling of key devices in an entire station. Details are not described herein again.

Figure 10:
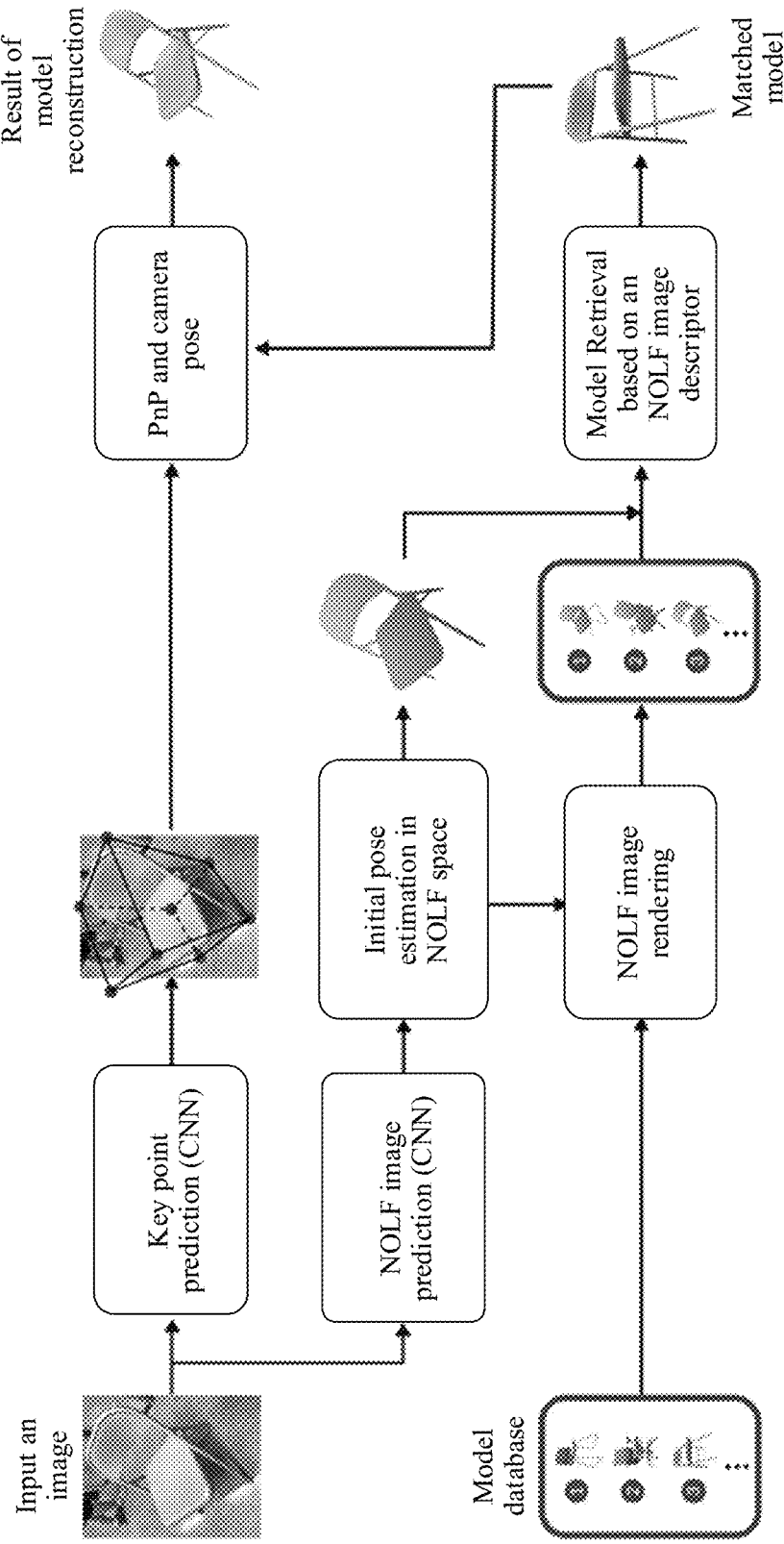
FIG. 10 is a schematic diagram of another embodiment of a three-dimensional reconstruction method according to an embodiment of this application.

FIG. 10 is a schematic diagram of another embodiment of a three-dimensional reconstruction method according to an embodiment of this application.

Two-dimensional image data is collected to collect information about a three-dimensional scenario, extrinsic parameter information of a camera for photographing an image is obtained by calculating a high-precision image pose, and a camera pose of the image may be obtained through calculation based on the extrinsic parameter information. Three-dimensional models of key objects that may appear in the three-dimensional scenario are integrated into a preset three-dimensional model database. The three-dimensional model database may be referred to as a model database for short, and is used as another input for modeling the three-dimensional scenario.

Operation 1: A to-be-modeled three-dimensional model target in a three-dimensional scenario in which an image is photographed is recognized by using a deep learning network, where the to-be-modeled three-dimensional model target is a target object in the image, and is referred to as a target, a modeling target, or a modeling object. In one embodiment, a mask (namely, the foregoing image mask) of a partial image region in which the target is located is obtained, and pixel coordinates of key points of the target and information about a normalized location field (namely, an NOLF image) are predicted. In one embodiment, a type to which the target belongs is predicted. A correspondence between a two-dimensional pixel of the modeling target in the image and three-dimensional points in normalized space is established by using the normalized location field image corresponding to the predicted modeling target. Four points are randomly sampled in the NOLF image, to establish a correspondence between four pixel coordinates and three-dimensional coordinates, and a relative pose of the modeling target in the normalized object space may be obtained through solving by using a PnP algorithm.

Operation 2: In one embodiment, a series of relative poses can be obtained by repeatedly performing sampling on the NOLF image. The relative poses are considered as a series of hypotheses, and N relative poses that meet a condition are extracted by using a hypothesis testing method. Clustering is performed based on the N relative poses, and an obtained relative pose corresponding to a cluster center is used as an initial pose of the modeling target in the normalized object space.

Operation 3: Normalized location field images of all three-dimensional models in the database in the pose are obtained through rendering by using the initial pose. In one embodiment, a three-dimensional model, in the three-dimensional model database, belonging to the type is determined as a candidate three-dimensional model based on the type of the target that is obtained in operation 1. The NOLF images are used as an information representation of the three-dimensional model database. Two-dimensional image information of the modeling target and information about the three-dimensional model database are represented in a same data form: the NOLF image corresponding to the modeling target in operation 1. In the initial relative pose predicted in operation 2, the NOLF image corresponding to the three-dimensional model is more similar to the NOLF image corresponding to the modeling target. This can reduce difficulty and complexity of retrieval.

Operation 4: A multidimensional feature of the NOLF image of the modeling target and a multidimensional feature of the NOLF image corresponding to the three-dimensional model in the preset model database are extracted based on another deep learning network and an image feature descriptor, to project the modeling target and the three-dimensional model in the preset model database on unified feature space. Model retrieval is performed by using a similarity between features. In one embodiment, a three-dimensional model corresponding to the modeling target is retrieved from the database by using a relative location relationship between the NOLF image of the modeling target and the NOLF image of the three-dimensional model in the preset model database in the feature space, and a closer Euclidean distance in the feature space indicates a higher similarity between the modeling target and a three-dimensional model.

Operation 5: A relative location relationship between the camera that inputs the image and an initial location of the three-dimensional model is established, by using the PnP algorithm, based on a correspondence between a vertex of a bounding box of the retrieved three-dimensional model and the predicted key points of the modeling target in the image. A location pose of the three-dimensional model corresponding to the modeling target in real three-dimensional space is finally restored based on the camera pose of the input image.

Operation 6: All modeling targets are traversed, and operation 2 to operation 5 are repeated, to restore poses of three-dimensional models of all targets in a three-dimensional environment, and complete three-dimensional modeling of the entire scenario.

Specifically, the pixel coordinates of the key points of the target object and the NOLF image of the target object at a photographing angle of view of the image are obtained by using an CNN, and the initial pose is estimated based on the NOLF image. For a plurality of three-dimensional models in the preset model database, a series of NOLF images are generated based on the initial pose, the NOLF image of the target object is compared with the series of NOLF images, and similarity is detected based on an NOLF image descriptor, to obtain a matched three-dimensional model. A pose of the target object may be obtained, by using the PnP algorithm, based on a camera pose of an original two-dimensional image. In this way, three-dimensional reconstruction of the target object is implemented. For a part corresponding to the foregoing in the embodiment corresponding to FIG. 10, refer to the foregoing corresponding descriptions. Details are not described herein again.

In one embodiment, a convolutional neural network predicts a type, an NOLF image, key points, and an instance segmentation mask based on a modeling target in a two-dimensional image. An input to the convolutional neural network is a two-dimensional RGB image including a plurality of modeling targets. The CNN can predict a type, a mask, an NOLF image, and pixel coordinates of eight key points of each modeling object. The network structure, based on a Mask R-CNN framework, can output the type and the mask of the target that can be predicted by the framework, and can also output the NOLF image and the key points. Eight corner points of a bounding box of a three-dimensional model, in space, corresponding to the target are projected on an input image based on an accurate pose.

The following describes, by using an example, an implementation for obtaining an NOLF image of a three-dimensional model. A directional normalized three-dimensional model may be obtained based on a three-dimensional model in a model database. In one embodiment, shape information and size information of a modeling target is encoded into predefined normalized object space, normalized coordinate space is established for three-dimensional models belonging to a same type, and an NOLF image at a specific angle of view may further be obtained based on the normalized three-dimensional model. For example, as shown in FIG. 7, an NOLF image is an image-like data expression form, and can encode XYZ coordinates of a three-dimensional model into normalized three-dimensional space. In other words, an RGB channel corresponding to each pixel coordinate of the image stores the XYZ coordinates of the three-dimensional model in the normalized three-dimensional space, instead of color information. In other words, each pixel coordinate corresponds to one three-dimensional coordinate. Therefore, a correspondence between pixel coordinates of the three-dimensional model in the image and the three-dimensional coordinates in the normalized three-dimensional space, that is, one NOLF image corresponds to a three-dimensional point cloud at a visible angle of view. It should be noted that the NOLF image may be defined independently based on a category of the model in consideration of shapes and geometric feature similarities of three-dimensional models of a same type. In one embodiment, normalized size scaling is performed on a three-dimensional model set of a same type, that is, lengths of diagonal lines of bounding boxes of all three-dimensional models are 1, and geometric centers of the bounding boxes are located at a center of the NOLF image. To ensure that the bounding box of the three-dimensional model is the most compact bounding box, an alignment operation is performed on all three-dimensional models, that is, directions of all models are the same, and X, Y, and Z axes of a model coordinate system are parallel to X, Y, and Z axes of a spatial coordinate system.

In one embodiment, a branch for predicting a type of a target and a branch for predicting an instance segmentation mask in this application are the same as an instance segmentation algorithm (Mask R-CNN). A branch for predicting key points is similar to a branch, of the Mask R-CNN, for outputting a two-dimensional bounding box. A difference lies in that four vertices of the two-dimensional bounding box that are recurred by the branch, of the Mask R-CNN, for outputting the bounding box are replaced with pixel coordinates of eight vertices of a three-dimensional bounding box that are recurred by the branch for predicting the key points.

There are a plurality of manners of predicting an NOLF image. In one embodiment, the NOLF image is obtained by using a deep learning network and an image mask. Compared with a general-purpose Mask R-CNN, the deep learning network has three new branch structures, respectively corresponding to x, y, and z coordinates of a predicted modeling object in normalized coordinate space. For each modeling object in an input image, a corresponding region of interest (ROI) feature vector is converted into a fixed size, and the fixed-size feature vector is used as feature data shared by a branch for predicting an instance segmentation mask and a branch for predicting an NOLF image. By using fully convolutional networks of a same structure, the branch for predicting the instance segmentation mask outputs one 56×56×N mask image, and three branches for predicting an NOLF image each output one 56×56×32×N image. N is a quantity of types to which a modeling object belongs, and 32 is a division depth of pixels of the NOLF image in X, Y, and Z directions in normalized space, that is, the NOLF image is equally divided into 32 parts along each coordinate in the normalized space. Therefore, an NOLF image prediction issue is converted into a depth division issue. This can improve robustness of training.

The following describes a method for training a convolutional neural network according to an embodiment of this application.

An input sample is a single two-dimensional image. The two-dimensional image has a label of a category, a mask, corner coordinates of a bounding box, and an NOLF image of a known to-be-modeled target. A convolutional neural network outputs the category of the to-be-modeled target, the image mask, and pixel coordinates of the corner points of the bounding box, and the NOLF image.

A loss function of the convolutional neural network is defined as:

$$L = a_1 L_{cls} + a_2 L_{mask} + a_3 L_{bb8} + a_4 L_{nolf}$$

$L_{cls}$ is a cross entropy loss function of a category, $L_{mask}$ indicates a loss function of a segmentation mask of a target, and $L_{bb8}$ is similar to a recursive loss function of a bounding box of a Mask R-CNN. However, a recursive output is changed from coordinates of four key points of a two-dimensional bounding box to coordinates of eight key points of a three-dimensional bounding box. $L_{nolf}$ is a loss function for predicting an NOLF image, and is specifically defined as:

$$L_{nolf} = \begin{cases} 5(p_i - p_j)^2/N, & \text{if } |p_i - p_j| < 0.1 \\ |p_i - p_j| - 0.05/N, & \text{if } |p_i - p_j| > 0.1 \end{cases}$$

$p_i$ and $p_j$ are respectively three-dimensional coordinates of a truth value and a prediction value of the NOLF image at same pixel coordinates, N indicates a quantity of pixels of the NOLF image, and $a_1$, $a_2$, $a_3$, and $a_4$ are separately weights of loss functions.

Figure 11:
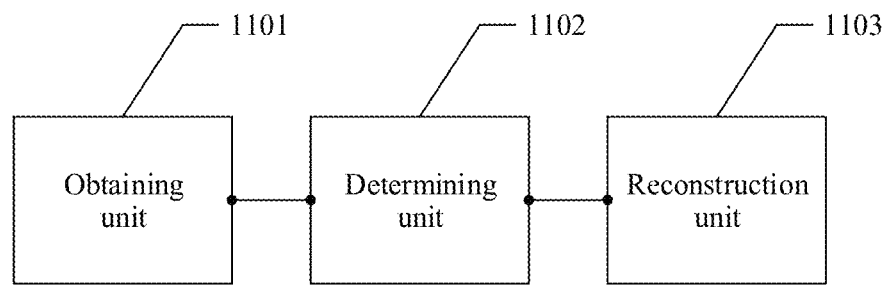
FIG. 11 is a schematic diagram of an embodiment of a three-dimensional reconstruction apparatus according to an embodiment of this application.

The foregoing describes the three-dimensional reconstruction method provided in this application. The following describes a three-dimensional reconstruction apparatus for implementing the three-dimensional reconstruction method. FIG. 11 is a schematic diagram of an embodiment of a three-dimensional reconstruction apparatus according to an embodiment of this application.

The three-dimensional reconstruction apparatus provided in this embodiment of this application includes:
an obtaining unit 1101, configured to obtain an image of a first object and a camera pose of the image;
a determining unit 1102, configured to determine a first normalized object location field NOLF image of the first object in the image by using a first deep learning network, where the first NOLF image indicates a normalized three-dimensional point cloud of the first object at a photographing angle of view of the image, where the determining unit 1102 is configured to determine, from a plurality of three-dimensional models in a model database based on the first NOLF image, a first model corresponding to the first object; and the determining unit 1102 is further configured to determine a pose of the first object based on the first model and the camera pose of the image; and a reconstruction unit 1103, configured to perform three-dimensional reconstruction on the first object in the image based on the first model and the pose of the first object.

In one embodiment, the determining unit 1102 is further configured to: determine a first relative pose of the first object based on the first NOLF image, where the first relative pose is a relative pose between the pose of the first object and the camera pose of the image; and determine NOLF images of the plurality of three-dimensional models at an angle of view corresponding to the first relative pose. The determining unit 1102 is specifically configured to determine, from the NOLF images respectively corresponding to the plurality of three-dimensional models, the first model corresponding to an NOLF image with a highest similarity to the first NOLF image.

The determining unit 1102 is specifically configured to: determine pixel coordinates of at least four feature points of the first object in the image by using a second deep learning network, where four object points indicated by the four feature points are not coplanar in three-dimensional space; determine three-dimensional coordinates of the at least four feature points in the first NOLF image; and determine the first relative pose based on the pixel coordinates and the three-dimensional coordinates of the at least four feature points.

In one embodiment, the determining unit 1102 is specifically configured to determine the first relative pose based on the pixel coordinates and the three-dimensional coordinates of the at least four feature points and by using a Perspective-n-Point PnP estimation algorithm.

In one embodiment, the feature points of the first object include eight corner points of a bounding box of the first object.

In one embodiment, the determining unit 1102 is specifically configured to: input the image to the first deep learning network, and determine a first original NOLF image; and determine the first NOLF image based on the first original NOLF image and an image mask of the first object.

In one embodiment, the model database includes types of the plurality of three-dimensional models, the first object belongs to a first type, and the determining unit 1102 is specifically configured to determine, based on the first NOLF image, the first model from three-dimension models belonging to the first type.

The foregoing units may be configured to perform the method described in any one of the foregoing embodiments. For a specific implementation process and technical effect, refer to the embodiments corresponding to FIG. 6 to FIG. 10. Details are not described herein again.

Figure 12:
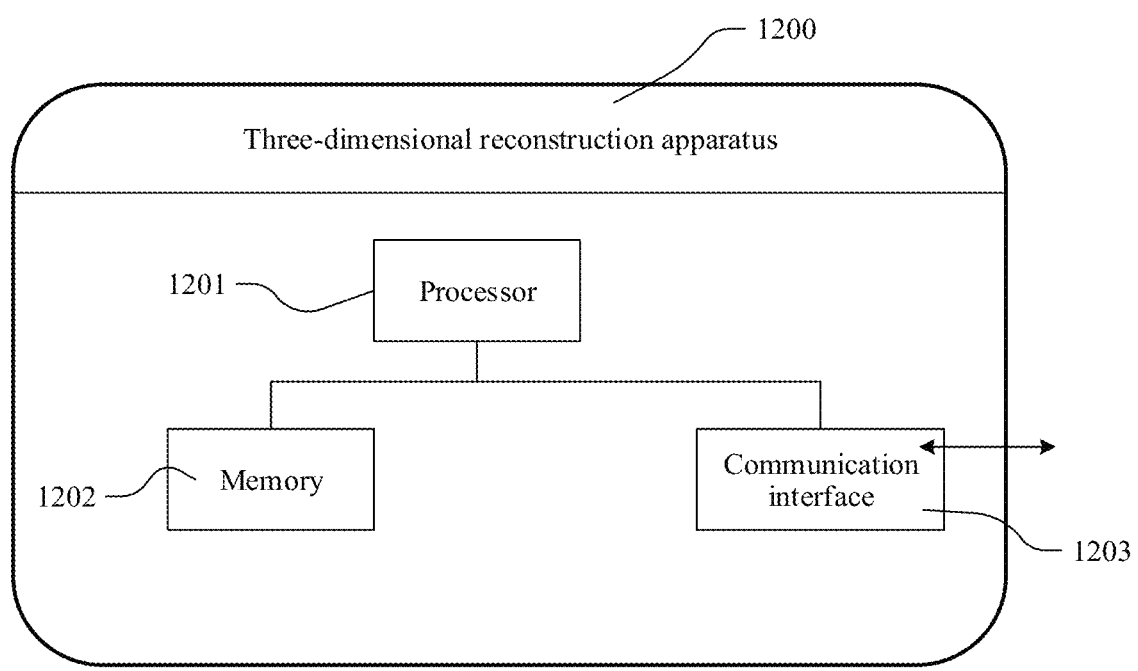
FIG. 12 is a schematic diagram of another embodiment of a three-dimensional reconstruction apparatus according to an embodiment of this application.

FIG. 12 is a schematic diagram of another embodiment of a three-dimensional reconstruction apparatus according to an embodiment of this application.

The three-dimensional reconstruction apparatus provided in this embodiment may be an electronic device such as a server or a terminal. A specific device form of the apparatus is not limited in this embodiment of this application.

The three-dimensional reconstruction apparatus 1200 may have a large difference due to different configurations or performance, and may include one or more processors 1201 and a memory 1202. The memory 1202 stores a program or data.

The memory 1202 may be a volatile memory or a non-volatile memory. In one embodiment, the one or more processors 1201 are one or more CPUs. The CPU may be a single-core CPU, or may be a multi-core CPU. The processor 1201 may communicate with the memory 1202, and execute a series of instructions in the memory 1202 on the three-dimensional reconstruction apparatus 1200.

The three-dimensional reconstruction apparatus 1200 further includes one or more wired or wireless network interfaces 1203, for example, an Ethernet interface.

In one embodiment, although not shown in FIG. 12, the three-dimensional reconstruction apparatus 1200 may further include one or more power supplies and one or more input/output interfaces. The input/output interface may be configured to connect to a display, a mouse, a keyboard, a touchscreen device, a sensing device, or the like. The input/output interface is an optional component, and may exist or may not exist. This is not limited herein.

For a process performed by the processor 1201 in the three-dimensional reconstruction apparatus 1200 in this embodiment, refer to the method process described in the foregoing method embodiments. Details are not described herein again.

Figure 13:
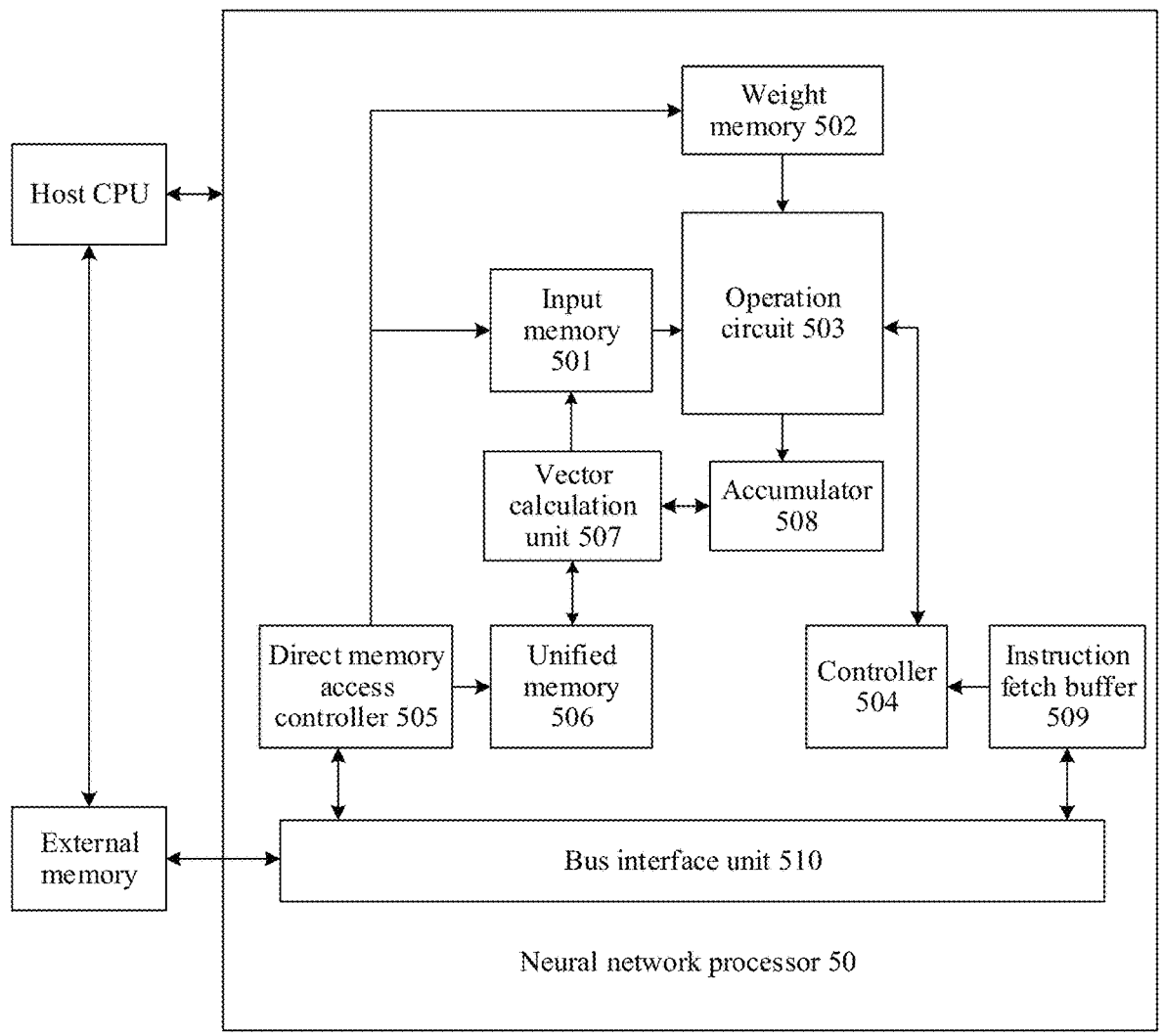
FIG. 13 is a diagram of a hardware structure of a chip according to an embodiment of this application.

FIG. 13 is a diagram of a hardware structure of a chip according to an embodiment of this application.

An embodiment of this application provides a chip system configured to implement the three-dimensional reconstruction method. Specifically, algorithms based on the convolutional neural network shown in FIG. 3 and FIG. 4 may be implemented in an NPU chip shown in FIG. 13.

A neural-network processing unit NPU 50, as a coprocessor, is mounted to a host CPU, and the host CPU assigns a task. A core part of the NPU is an operation circuit 503, and a controller 504 controls the operation circuit 503 to extract matrix data in a memory and perform a multiplication operation.

In some embodiments, the operation circuit 503 includes a plurality of processing engines (processing engine, PE) inside. In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from a weight memory 502, and buffers the corresponding data into each PE in the operation circuit. The operation circuit extracts data of the matrix A from an input memory 501, to perform a matrix operation on the matrix B, and a partial result or a final result of an obtained matrix is stored in an accumulator 508.

A unified memory 506 is configured to store input data and output data. Weight data is transferred to the weight memory 502 by using a direct memory access controller (DMAC) 505. The input data is also transferred to the unified memory 506 by using the DMAC.

A BIU is a bus interface unit, in other words, a bus interface unit 510, and is configured to perform interaction between an AXI bus, and the DMAC and an instruction fetch buffer 509.

The bus interface unit (BIU) 510 is used by the instruction fetch buffer 509 to obtain instructions from an external memory, and is further used by the direct memory access controller 505 to obtain original data of the input matrix A or the weight matrix B from the external memory.

The DMAC is mainly configured to transfer input data in the external memory DDR to the unified memory 506, or transfer the weight data to the weight memory 502, or transfer the input data to the input memory 501.

A vector calculation unit 507 may include a plurality of operation processing units. If required, further processing is performed on an output of the operation circuit, for example, vector multiplication, vector addition, an exponential operation, a logarithmic operation, or size comparison. The vector calculation unit 507 is mainly configured to perform network computing at a non-convolution/FC layer in a neural network, for example, pooling, batch normalization, or local response normalization.

In embodiments, the vector calculation unit 507 can store a processed output vector in a unified memory 506. For example, the vector calculation unit 507 may apply a non-linear function to an output, for example, a vector of an accumulated value, of the operation circuit 503 to generate an activation value. In some implementations, the vector calculation unit 507 generates a normalized value, a combined value, or both a normalized value and a combined value. In some implementations, the processed output vector can be used as an activation input for the operation circuit 503, for example, used in a subsequent layer in the neural network.

The instruction fetch buffer 509 connected to the controller 504 is configured to store instructions used by the controller 504.

The unified memory 506, the input memory 501, the weight memory 502, and the instruction fetch buffer 509 are all on-chip memories. The external memory is private for the NPU hardware architecture.

Figure 4:
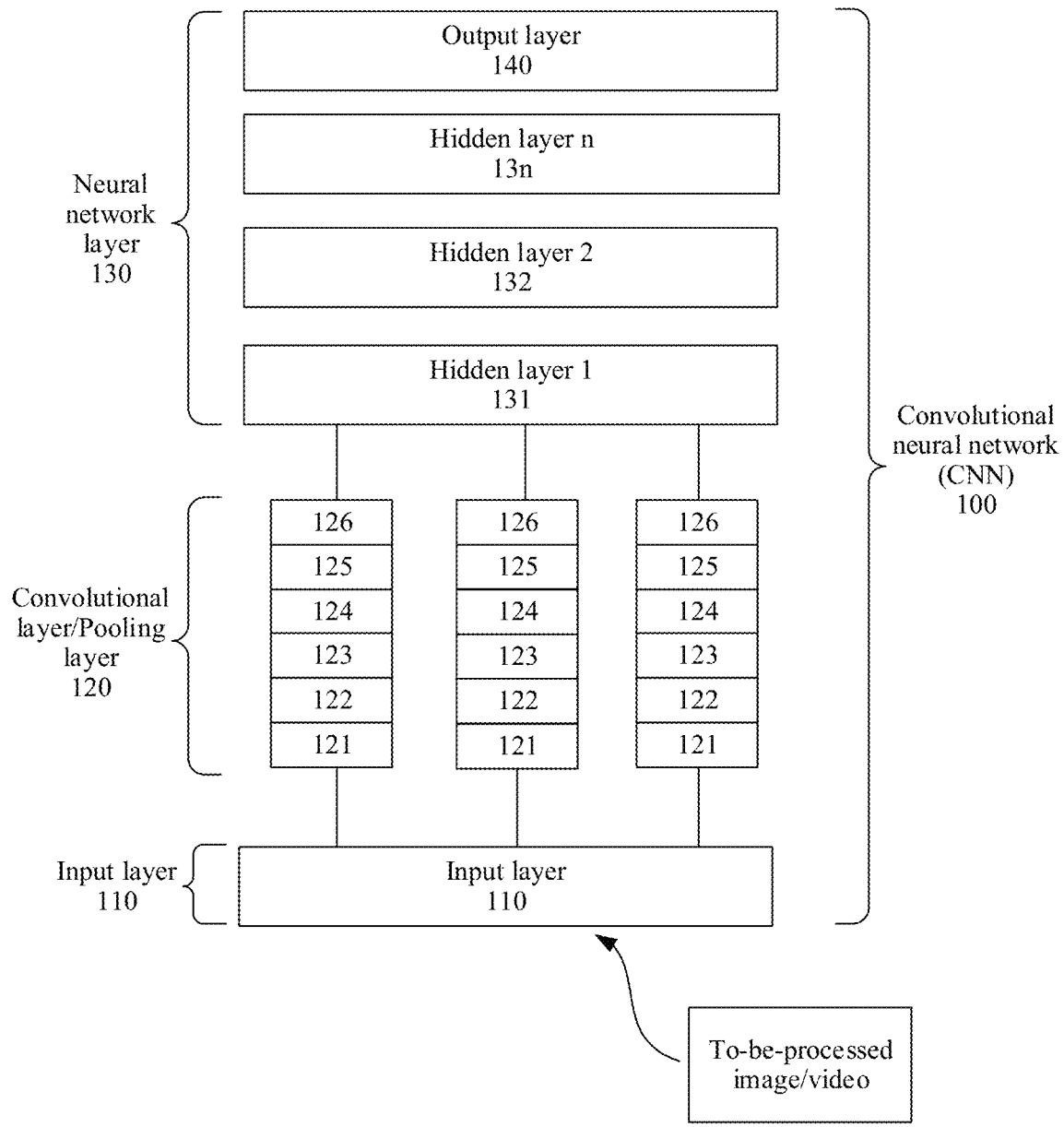
FIG. 4 is a schematic diagram of a structure of another convolutional neural network according to an embodiment of this application.

An operation at each layer in the convolutional neural network shown in FIG. 3 and the convolutional neural network FIG. 4 may be performed by a matrix computing unit 212 or the vector calculation unit 507.

In the embodiments of this application, for ease of understanding, a plurality of examples are used for description. However, these examples are merely examples, but this does not mean that these examples are optimal implementations for implementing this application.

All or some of the foregoing embodiments may be implemented by using software, hardware, firmware, or any combination thereof. When the software is used for implementation, all or some of the embodiments may be implemented in a form of a computer program product.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A three-dimensional reconstruction method, comprising:

obtaining an image of a first object and a camera pose of the image;

determining a first normalized object location field (NOLF) image of the first object in the image by using a first deep learning network, wherein the first NOLF image indicates a normalized three-dimensional point cloud of the first object at a photographing angle of view of the image;

determining a first relative pose of the first object based on the first NOLF image, wherein the first relative pose is a relative pose between a pose of the first object and the camera pose of the image, wherein the determining the first relative pose of the first object based on the first NOLF image comprises:

determining pixel coordinates of at least four feature points of the first object in the image by using a second deep learning network, wherein four object points indicated by the four feature points are not coplanar in a three-dimensional space;

determining three-dimensional coordinates of the at least four feature points in the first NOLF image; and determining the first relative pose based on the pixel coordinates and the three- dimensional coordinates of the at least four feature points;

determining a plurality of NOLF images of a plurality of three-dimensional models at an angle of view corresponding to the first relative pose;

determining, from the plurality of three-dimensional models in a model database based on the first NOLF image, a first model corresponding to the first object;

determining the pose of the first object based on the first model and the camera pose of the image; and performing a three-dimensional reconstruction on the first object in the image based on the first model and the pose of the first object.

2. The method according to claim 1,
wherein the determining, from the plurality of three-dimensional models in the model database based on the first NOLF image, the first model corresponding to the first object comprises:
determining, from the plurality of NOLF images respectively corresponding to the plurality of three-dimensional models, the first model corresponding to an NOLF image of the plurality of NOLF images with a highest similarity to the first NOLF image.

3. The method according to claim 1, wherein the determining the first relative pose based on the pixel coordinates and the three-dimensional coordinates of the at least four feature points comprises:
determining the first relative pose based on the pixel coordinates and the three- dimensional coordinates of the at least four feature points by using a Perspective-n-Point (PnP) estimation algorithm.

4. The method according to claim 1, wherein
the feature points of the first object comprise eight corner points of a bounding box of the first object.

5. The method according to claim 1, wherein the determining the first NOLF image of the first object in the image by using the first deep learning network comprises:
inputting the image to the first deep learning network;
determining a first original NOLF image; and
determining the first NOLF image based on the first original NOLF image and an image mask of the first object.

6. The method according to claim 1, wherein the model database comprises one or more types of the plurality of three-dimensional models, wherein the first object belongs to a first type, the method further comprising:
determining, based on the first NOLF image, the first model from three-dimension models belonging to the first type.

7. A three-dimensional reconstruction apparatus, comprising a processor and a memory, wherein the processor and the memory are interconnected, wherein the memory is configured to store a computer program comprising program instructions, and wherein the processor is configured to invoke the program instructions to:
obtain an image of a first object and a camera pose of the image;
determine a first normalized object location field NOLF image of the first object in the image by using a first deep learning network, wherein the first NOLF image indicates a normalized three-dimensional point cloud of the first object at a photographing angle of view of the image;
determine a first relative pose of the first object based on the first NOLF image, wherein the first relative pose is a relative pose between a pose of the first object and the camera pose of the image, wherein the processor is further configured to invoke the program instructions to:

determine pixel coordinates of at least four feature points of the first object in the image by using a second deep learning network, wherein four object points indicated by the four feature points are not coplanar in a three-dimensional space;

determine three-dimensional coordinates of the at least four feature points in the first NOLF image; and determine a first relative pose based on the pixel coordinates and the three- dimensional coordinates of the at least four feature points; and determine a plurality of NOLF images of a plurality of three-dimensional models at an angle of view corresponding to the first relative pose;

determine, from the plurality of three-dimensional models in a model database based on the first NOLF image, a first model corresponding to the first object;

determine the pose of the first object based on the first model and the camera pose of the image; and perform a three-dimensional reconstruction on the first object in the image based on the first model and the pose of the first object.

8. The apparatus according to claim 7,
wherein, to determine, from the plurality of three-dimensional models in the model database based on the first NOLF image, the first model corresponding to the first object, the processor is further configured to invoke the program instructions to:
determine, from the plurality of NOLF images respectively corresponding to the plurality of three-dimensional models, the first model corresponding to an NOLF image of the plurality of NOLF images with a highest similarity to the first NOLF image.

9. The apparatus according to claim 7, wherein the processor is further configured to invoke the program instructions to:
determine the first relative pose based on the pixel coordinates and the three-dimensional coordinates of the at least four feature points by using a Perspective-n-Point PnP estimation algorithm.

10. The apparatus according to claim 7, wherein the feature points of the first object comprise eight corner points of a bounding box of the first object.

11. The apparatus according to claim 7, wherein the processor is further configured to invoke the program instructions to:
input the image to the first deep learning network, and determining a first original NOLF image; and
determine the first NOLF image based on the first original NOLF image and an image mask of the first object.

12. The apparatus according to claim 7, wherein the model database comprises one or more types of the plurality of three-dimensional models, wherein the first object belongs to a first type, wherein the processor is further configured to invoke the program instructions to:
determine, based on the first NOLF image, the first model from three-dimension models belonging to the first type.

13. A non-transitory computer-readable storage medium, storing one or more instructions that, when the computer-readable storage medium is in a first communications apparatus, executed by at least one processor, cause the at least one processor to:
obtain an image of a first object and a camera pose of the image;
determine a first normalized object location field NOLF image of the first object in the image by using a first deep learning network, wherein the first NOLF image indicates a normalized three-dimensional point cloud of the first object at a photographing angle of view of the image;

determine a first relative pose of the first object based on the first NOLF image, wherein the first relative pose is a relative pose between a pose of the first object and the camera pose of the image, wherein the at least one processor is further caused to:
- determine pixel coordinates of at least four feature points of the first object in the image by using a second deep learning network, wherein four object points indicated by the four feature points are not coplanar in a three-dimensional space;
- determine three-dimensional coordinates of the at least four feature points in the first NOLF image; and
- determine a first relative pose based on the pixel coordinates and the three- dimensional coordinates of the at least four feature points;

determine a plurality of NOLF images of a plurality of three-dimensional models at an angle of view corresponding to the first relative pose;

determine, from the plurality of three-dimensional models in a model database based on the first NOLF image, a first model corresponding to the first object;

determine the pose of the first object based on the first model and the camera pose of the image; and perform a three-dimensional reconstruction on the first object in the image based on the first model and the pose of the first object.

14. The non-transitory computer-readable storage medium according to claim 13,
wherein, to determine, from the plurality of three-dimensional models in the model database based on the first NOLF image, the first model corresponding to the first object, the processor is further caused to:
- determine, from the plurality of NOLF images respectively corresponding to the plurality of three-dimensional models, the first model corresponding to an NOLF image of the plurality of NOLF images with a highest similarity to the first NOLF image.

15. The non-transitory computer-readable storage medium according to claim 13, wherein the one or more instructions, when executed, further cause the at least one processor to:
- determine the first relative pose based on the pixel coordinates and the three-dimensional coordinates of the at least four feature points by using a Perspective-n-Point PnP estimation algorithm.

16. The non-transitory computer-readable storage medium according to claim 13, wherein
the feature points of the first object comprise eight corner points of a bounding box of the first object.

17. The non-transitory computer-readable storage medium according to claim 13, wherein the one or more instructions, when executed, further cause the at least one processor to:
- input the image to the first deep learning network;
- determine a first original NOLF image; and
- determine the first NOLF image based on the first original NOLF image and an image mask of the first object.

* * * * *

UNITED STATES PATENT AND TRADEMARK OFFICE
CERTIFICATE OF CORRECTION

| | | |
|---|---|---|
| PATENT NO. | : 12,307,699 B2 | Page 1 of 1 |
| APPLICATION NO. | : 17/902624 | |
| DATED | : May 20, 2025 | |
| INVENTOR(S) | : Hao Wang and Linlin Zhang | |

It is certified that error appears in the above-identified patent and that said Letters Patent is hereby corrected as shown below:

On the Title Page

Item (63) Foreign Priority data; insert --CN 202010143002.1 03/04/2020--.

Signed and Sealed this
Twelfth Day of August, 2025

Coke Morgan Stewart
*Acting Director of the United States Patent and Trademark Office*